(12) United States Patent
Araki

(10) Patent No.: US 11,205,009 B2
(45) Date of Patent: Dec. 21, 2021

(54) INFORMATION PROCESSING APPARATUS, INFORMATION PROCESSING SYSTEM, AND CONTROL METHOD

(71) Applicant: Shigeo Araki, Kanagawa (JP)

(72) Inventor: Shigeo Araki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 165 days.

(21) Appl. No.: 16/676,682

(22) Filed: Nov. 7, 2019

(65) Prior Publication Data
US 2020/0175188 A1 Jun. 4, 2020

(30) Foreign Application Priority Data
Nov. 29, 2018 (JP) .............................. JP2018-224055

(51) Int. Cl.
*G06F 21/62* (2013.01)
*H04L 29/06* (2006.01)
*G06F 21/35* (2013.01)

(52) U.S. Cl.
CPC .......... *G06F 21/6218* (2013.01); *G06F 21/35* (2013.01); *G06F 21/6209* (2013.01); *H04L 63/0853* (2013.01); *H04L 63/0861* (2013.01); *H04L 63/101* (2013.01); *H04L 63/102* (2013.01)

(58) Field of Classification Search
CPC .. G06F 21/6218; G06F 21/6209; G06F 21/35; H04L 63/102; H04L 63/101; H04L 63/0853; H04L 63/0861
See application file for complete search history.

(56) References Cited

U.S. PATENT DOCUMENTS 7,221,387 B2 * 5/2007 Fernandez ......... H04N 21/2543
348/14.08
7,242,389 B1 * 7/2007 Stern ..................... G06Q 10/10
345/158

(Continued)

FOREIGN PATENT DOCUMENTS

JP 2006-005590 1/2006
JP 2018-055632 4/2018

OTHER PUBLICATIONS

D. M. Russell, J. P. Trimble and A. Dieberger, "The use patterns of large, interactive display surfaces: Case studies of media design and use for blueboard and MERboard," 37th Annual Hawaii International Conference on System Sciences, 2004. Proceedings of the, 2004, pp. 10. (Year: 2004).*

(Continued)

*Primary Examiner* — Kari L Schmidt
(74) *Attorney, Agent, or Firm* — IPUSA, PLLC

(57) ABSTRACT

An information processing apparatus for use by a plurality of users is provided. The information processing apparatus includes a memory; and a processor coupled to the memory and configured to authenticate logins of the plurality of users, register, on a list of participants, the plurality of users whose logins have been authenticated, perform recognition of each of the plurality of users registered on the list of participants, and restrict access to a resource owned by a given user while keeping the given user registered on the list of participants, in response to determining that the given user satisfies a predetermined condition based on a result of the recognition.

8 Claims, 22 Drawing Sheets

(56) References Cited

U.S. PATENT DOCUMENTS

| | | | | |
|---|---|---|---|---|
| 7,730,030 B1* | 6/2010 | Xu | | G06F 7/00 |
| | | | | 707/617 |
| 7,957,022 B2* | 6/2011 | Anno | | G06F 21/6218 |
| | | | | 358/1.15 |
| 8,996,397 B2* | 3/2015 | Grace | | G06Q 10/063114 |
| | | | | 705/7.39 |
| 9,445,271 B2* | 9/2016 | Kim | | H04W 12/08 |
| 9,516,022 B2* | 12/2016 | Borzycki | | G06F 21/35 |
| 9,720,559 B2* | 8/2017 | Tan | | G06F 3/04883 |
| 10,126,927 B1* | 11/2018 | Fieldman | | H04L 51/32 |
| 10,271,159 B2* | 4/2019 | Yamane | | H04W 4/02 |
| 2009/0099895 A1* | 4/2009 | Carrier | | G06Q 50/01 |
| | | | | 705/75 |
| 2010/0318470 A1* | 12/2010 | Meinel | | G06Q 10/00 |
| | | | | 705/300 |
| 2011/0092279 A1* | 4/2011 | Pilip | | A63F 13/77 |
| | | | | 463/29 |
| 2011/0119768 A1* | 5/2011 | Engdahl | | H04L 63/10 |
| | | | | 726/27 |
| 2013/0047093 A1* | 2/2013 | Reuschel | | G06F 3/1423 |
| | | | | 715/753 |
| 2014/0041042 A1* | 2/2014 | Wong | | G06F 21/6245 |
| | | | | 726/26 |
| 2014/0055400 A1* | 2/2014 | Reuschel | | G06F 3/011 |
| | | | | 345/173 |
| 2014/0109210 A1* | 4/2014 | Borzycki | | G06F 21/32 |
| | | | | 726/7 |
| 2014/0115490 A1* | 4/2014 | Yamasani | | G06F 3/048 |
| | | | | 715/743 |
| 2014/0165152 A1* | 6/2014 | Farouki | | H04L 63/08 |
| | | | | 726/4 |
| 2015/0332037 A1* | 11/2015 | Tse | | G06K 9/00288 |
| | | | | 726/19 |
| 2016/0352787 A1* | 12/2016 | Kato | | H04L 63/083 |
| 2017/0011227 A1* | 1/2017 | Tse | | G06K 9/00288 |
| 2019/0020770 A1 | 1/2019 | Araki | | |
| 2019/0129669 A1 | 5/2019 | Takahashi et al. | | |
| 2019/0235735 A1 | 8/2019 | Toyota et al. | | |
| 2020/0117779 A1* | 4/2020 | Jain | | G06F 21/32 |
| 2020/0120088 A1* | 4/2020 | Jain | | G06F 21/32 |
| 2020/0120094 A1* | 4/2020 | Jain | | H04L 63/107 |
| 2020/0380972 A1* | 12/2020 | Carrigan | | G06F 9/451 |
| 2021/0051035 A1* | 2/2021 | Atkins | | H04L 12/1827 |

OTHER PUBLICATIONS

Park, Seonwook, et al. "Adam: Adapting multi-user interfaces for collaborative environments in real-time." Proceedings of the 2018 CHI Conference on Human Factors in Computing Systems. 2018, pp. 1-14. (Year: 2018).*

* cited by examiner

FIG.5

SERVICE ACCOUNT INFORMATION

| USER ID | NAME | EMAIL ADDRESS |
|---------|------|---------------|
| a01 | MARY | a01@example.com |
| a02 | SATO | a02@example.com |
| ... | ... | ... |

FIG.6

STORAGE INFORMATION

| OWNER USER | TYPE | NAME |
|------------|------|------|
| a02 | FILE | a02.doc |
| a02 | FOLDER | /WeeklyMeeting |

FIG.7

LIST OF USER INFORMATION

| USER ID | NAME | SETTING INFORMATION | SERVICE INFORMATION | IDENTIFICATION INFORMATION |
|---|---|---|---|---|
| user001 | MARY SMITH | setting1 | service11, service12 | ICCARD-123 |
| user002 | SATO SUZUKI | setting2 | service21, service22 | ICCARD-248 |
| user003 | SAITO YU | setting3 | service3 | ICCARD-390 |
| ... | ... | ... | ... | ... |

FIG.8

LIST OF SERVICE INFORMATION

| SERVICE INFORMATION | USER ID | ADDRESS INFORMATION | EXTERNAL SERVICE USER ID | EXTERNAL SERVICE AUTHENTICATION TOKEN |
|---|---|---|---|---|
| service11 | user001 | office@example.com | a01 | eyJhbGc11... |
| service12 | user001 | suite@example.com | b01 | eyJhbGc12... |
| service21 | user002 | office@example.com | a02 | eyJhbGc21... |
| service22 | user002 | suite@example.com | b02 | eyJhbGc22... |
| service3 | user003 | alice@example.com | | |
| ... | | | ... | ... |

FIG.9

| USER ID | FEATURE POINT DATA |
|---|---|
| user001 | C802FFC2... |
| user002 | B88820FE... |
| ... | |

FIG.11

LIST OF PARTICIPANTS

| USER ID | USER NAME | AUTHENTICATION STATE | LAST AUTHENTICATION TIME | DISTRIBUTION DESTINATION |
|---|---|---|---|---|
| user001 | MARY SMITH | UNAUTHENTICATED | 2018/4/29 13:00:00 | a01@office.example.com |
| user002 | SATO SUZUKI | AUTHENTICATED | 2018/4/29 13:15:00 | a02@office.example.com |
| user003 | SAITO YU | AUTHENTICATED | 2018/4/29 13:16:00 | a03@office.example.com |
| ... | ... | ... | ... | ... |

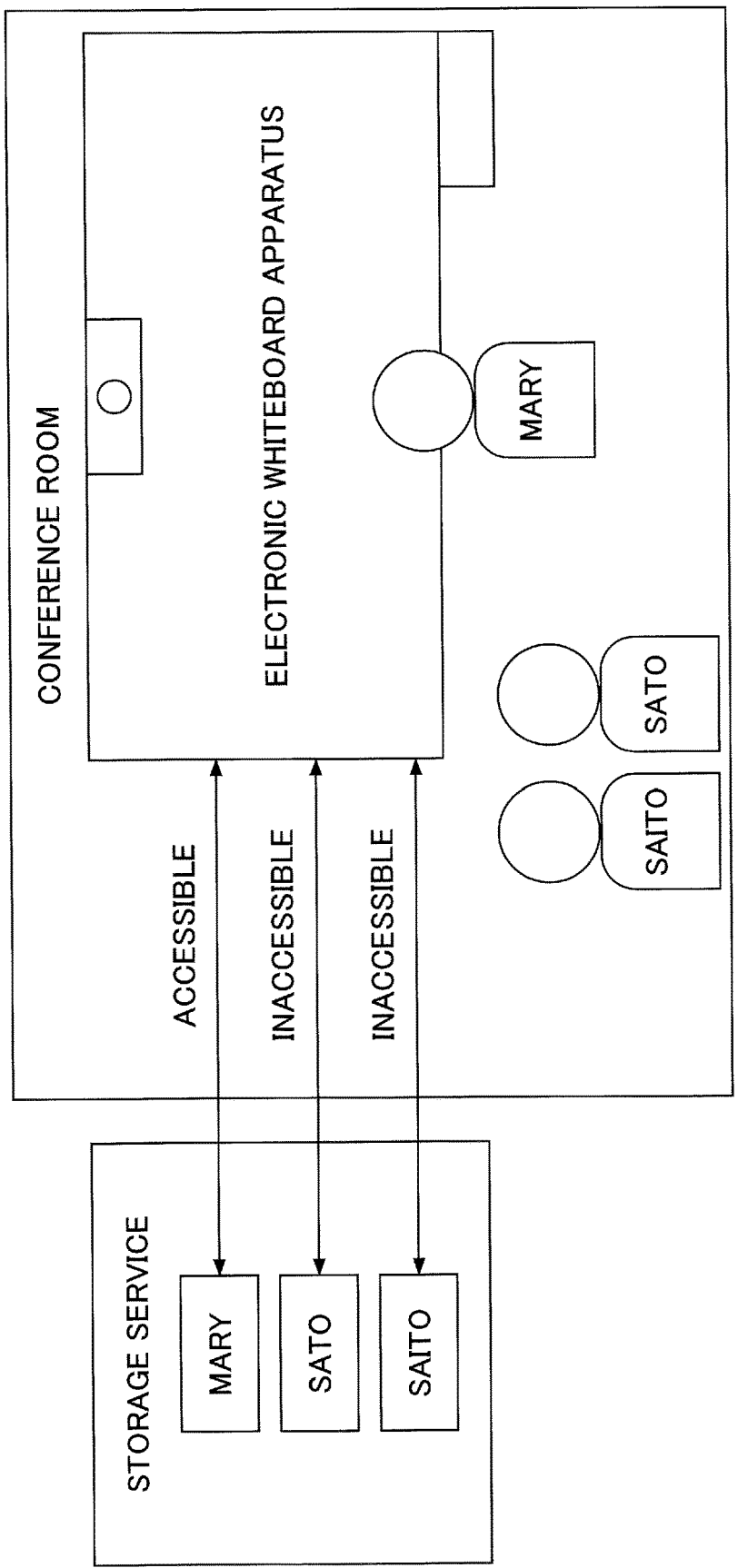

FIG.15

| SERVICE INFORMATION | USER ID | ADDRESS INFORMATION | EXTERNAL SERVICE USER ID | EXTERNAL SERVICE AUTHENTICATION TOKEN |
|---|---|---|---|---|
| service11 | user001 | office.example.com | a01 | eyJhbGc11··· |
| service12 | user001 | suite.example.com | b01 | eyJhbGc12··· |

INFORMATION PROCESSING APPARATUS, INFORMATION PROCESSING SYSTEM, AND CONTROL METHOD

CROSS-REFERENCE TO RELATED APPLICATION

The present application claims priority under 35 U.S.C. § 119 to Japanese Patent Application No. 2018-224055, filed on Nov. 29, 2018, the entire contents of which are incorporated herein by reference.

BACKGROUND OF THE INVENTION

1. Field of the Invention

The disclosures herein generally relate to an information processing apparatus, an information processing system, and a control method.

2. Description of the Related Art

Patent Document 1 below describes a technique that authenticates participants of a remote conference, thereby allowing personal files and shared files stored in a shared work space server to be shared by the participants.

However, in the above technique, in information processing apparatus such as an electronic whiteboard apparatus to which multiple users are logged in, if a user moves away from the information processing apparatus, the other users may be able to access the user's resources without permission.

RELATED-ART DOCUMENTS

Patent Documents

Patent Document 1: Japanese Unexamined Patent Application Publication No. 2006-5590

SUMMARY OF THE INVENTION

According to an embodiment of the present invention, an information processing apparatus for use by a plurality of users is provided. The information processing apparatus includes a memory; and a processor coupled to the memory and configured to authenticate logins of the plurality of users, register, on a list of participants, the plurality of users whose logins have been authenticated, perform recognition of each of the plurality of users registered on the list of participants, and restrict access to a resource owned by a given user while keeping the given user registered on the list of participants, in response to determining that the given user satisfies a predetermined condition based on a result of the recognition.

BRIEF DESCRIPTION OF THE DRAWINGS

FIG. 5 is a table illustrating an example of service account information;

FIG. 6 is a table illustrating an example of storage information;

FIG. 7 is a table illustrating an example of a list of user information;

FIG. 8 is a table illustrating an example of a list of service information;

FIG. 9 is a table illustrating an example of feature point information used by the electronic whiteboard apparatus according to the embodiment;

FIG. 11 is a table illustrating the list of participants used in the information processing system according to the embodiment;

FIG. 12A through FIG. 12C are diagrams illustrating an outline of a process performed by the information processing system according to the embodiment;

FIG. 15 is a table illustrating an example of service information obtained by the participant management unit according to the embodiment;

DESCRIPTION OF THE EMBODIMENTS

It is a general object of at least one embodiment of the present invention to prevent unauthorized access to a user's resources from other users when the user moves away from an information processing apparatus.

In the following, embodiments of the present invention will be described with reference to the accompanying drawings. In the embodiments, an electronic whiteboard apparatus that performs remote sharing will be described as an example of an "information processing apparatus". However, the information processing apparatus is not limited to the electronic whiteboard apparatus, and may be a personal computer (PC).

(System Configuration)

Figure 1:
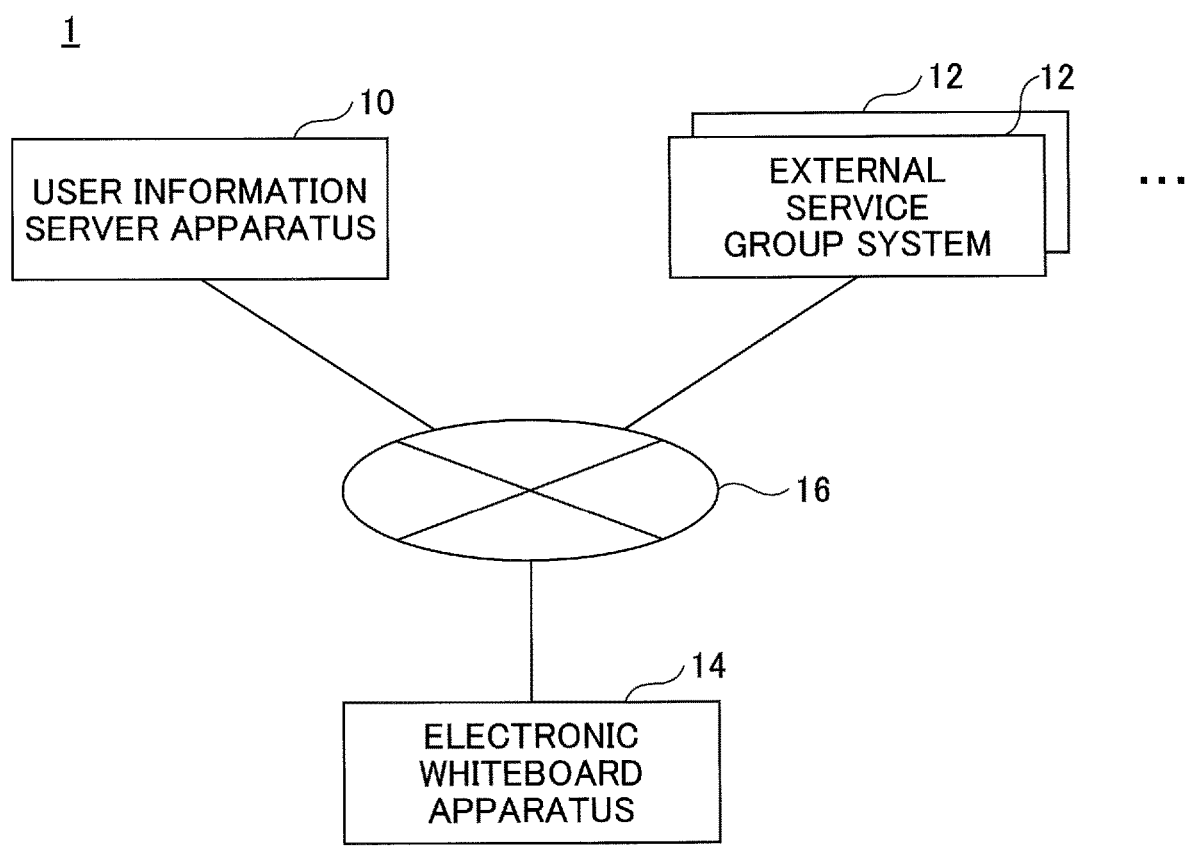
FIG. 1 is a diagram illustrating an example of a configuration of an information processing system according to an embodiment.

FIG. 1 is a diagram illustrating an example of a configuration of an information processing system according to an embodiment. In an information processing system 1 of FIG. 1, a user information server apparatus 10, a plurality of external service group systems 12, and an electronic whiteboard apparatus 14 are communicatively connected to each other via a network 16 such as the Internet or a local area network (LAN). The user information server apparatus 10 and the electronic whiteboard apparatus 14 constitute an electronic whiteboard system. The user information server apparatus 10 and the electronic whiteboard apparatus 14 operate in conjunction with the external service group systems 12 located outside the electronic whiteboard system, and provide functions related to the electronic whiteboard apparatus 14.

External service groups provided by the external service group systems 12 are also called groupware, which allows services belonging to the same external service group to be used with same authentication information (such as a combination of identification (ID) and a password or an access token).

For example, an external service group refers to an integrated service such as Office 365 (registered trademark), which includes a user service, a storage service, a schedule service, and a site sharing service. The external service group is provided such that the user service, the storage service, the schedule service, the site sharing service, and other services can be used with the same user account.

For example, multiple external service groups are provided by different companies. Thus, it is assumed that a single user uses an external service group of Company A and also uses an external service group of Company B. However, this is merely an example, and multiple external service groups may be provided by the same company. The external service group systems 12 are implemented by one or more computers.

The user information server apparatus 10 stores service account information (see FIG. 5), and is available from the electronic whiteboard apparatus 14. The user information server apparatus 10 is not required to be located on a same network segment. Further, the user information server apparatus 10 may be included in the electronic whiteboard apparatus 14. The user information server apparatus 10 is implemented by one or more computers.

For example, the electronic whiteboard apparatus 14 displays an image drawn by an electronic pen or by a user's hand. Further, the electronic whiteboard apparatus 14 displays an image of an electronic file, which is read from a PC connected via a USB memory or a cable or is read from the external service group system 12. The electronic whiteboard apparatus 14 has a plurality of authentication functions for authenticating a user, such as IC card authentication and face authentication.

The electronic whiteboard apparatus 14 is an example of the "information processing apparatus". However, the "information processing apparatus" may be any information processing apparatus, as long as the information processing apparatus can be used by a plurality of users. Note that the configuration of the information processing system 1 illustrated in FIG. 1 is merely an example. For example, some functions of the electronic whiteboard apparatus 14 may be included in the user information server apparatus 10, the external service group systems 12, or any other server apparatus. In addition, for example, some functions of the user information server apparatus 10 may be included in the electronic whiteboard apparatus 14, the external service group systems 12, or any other server apparatus.

(Hardware Configuration of Computer)

Figure 2:
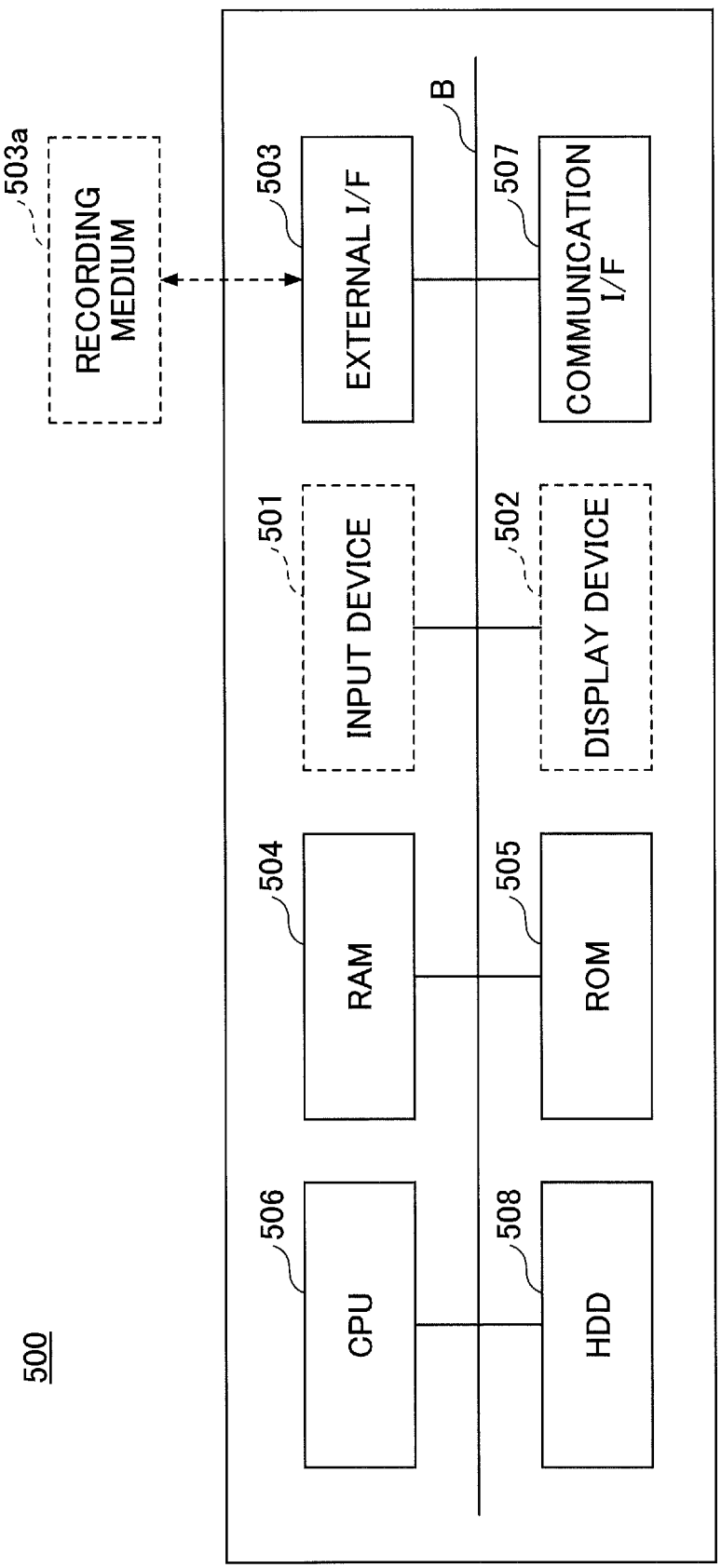
FIG. 2 is a diagram illustrating an example of a hardware configuration of a computer.

FIG. 2 is a diagram illustrating an example of a hardware configuration of a computer. For example, functions of the user information server apparatus 10 and the external service group systems 12 illustrated in FIG. 1 are implemented by a computer having the hardware configuration illustrated in FIG. 2.

A computer 500 illustrated in FIG. 2 includes an input device 501, a display device 502, an external interface (I/F) 503, a random-access memory (RAM) 504, a read-only memory (ROM) 505, a central processing unit (CPU) 506, a communication interface (I/F) 507, and a hard disk drive (HDD) 508, which are connected to each other via a bus B. Note that the input device 501 and the display device 502 may be connected to the computer 500 and used when necessary.

The input device 501 includes a keyboard, a mouse, and a touch panel, and is used by a user to input operation signals. The display device 502 includes a display, for example, and displays processing results obtained from the computer 500.

The communication I/F 507 is an interface that connects the computer 500 to various networks. The computer 500 can perform data communication via the communication I/F 507.

The HDD 508 is an example of a non-volatile storage device that stores programs and data. The programs and data stored in the HDD 508 include an operating system (OS) that is basic software for controlling the entire computer 500, and applications that provide functions on the OS. Instead of the HDD 508, the computer 500 may use a drive device (such as a solid-state drive) that uses flash memory as a storage medium.

The external I/F 503 is an interface with an external device. Examples of the external device include a recording medium 503a. The computer 500 can read from and write to the recording medium 503a via the external I/F 503. The recording medium 503a includes a flexible disk, a compact disc (CD), a digital versatile disc (DVD), a secure digital (SD) memory card, a universal serial bus (USB) memory, and a subscriber identity module (SIM) card.

The ROM 505 is an example of a non-volatile semiconductor memory (storage device) that can retain programs and data even when the power is turned off. The ROM 505 stores programs and data such as the basic input/output system (BIOS) executed at the start of the computer 500, OS settings, and network settings. The RAM 504 is an example of a volatile semiconductor memory (storage device) that temporarily stores programs and data.

The CPU 506 is a processor that reads programs and data from a storage device such as the ROM 505 or the HDD 508 into the RAM 504 and performs operations so as to control the entire computer 500 and implement functions. The CPU 506 may be implemented by one or more processors.

(Hardware Configuration of Electronic Whiteboard Apparatus)

Figure 3:
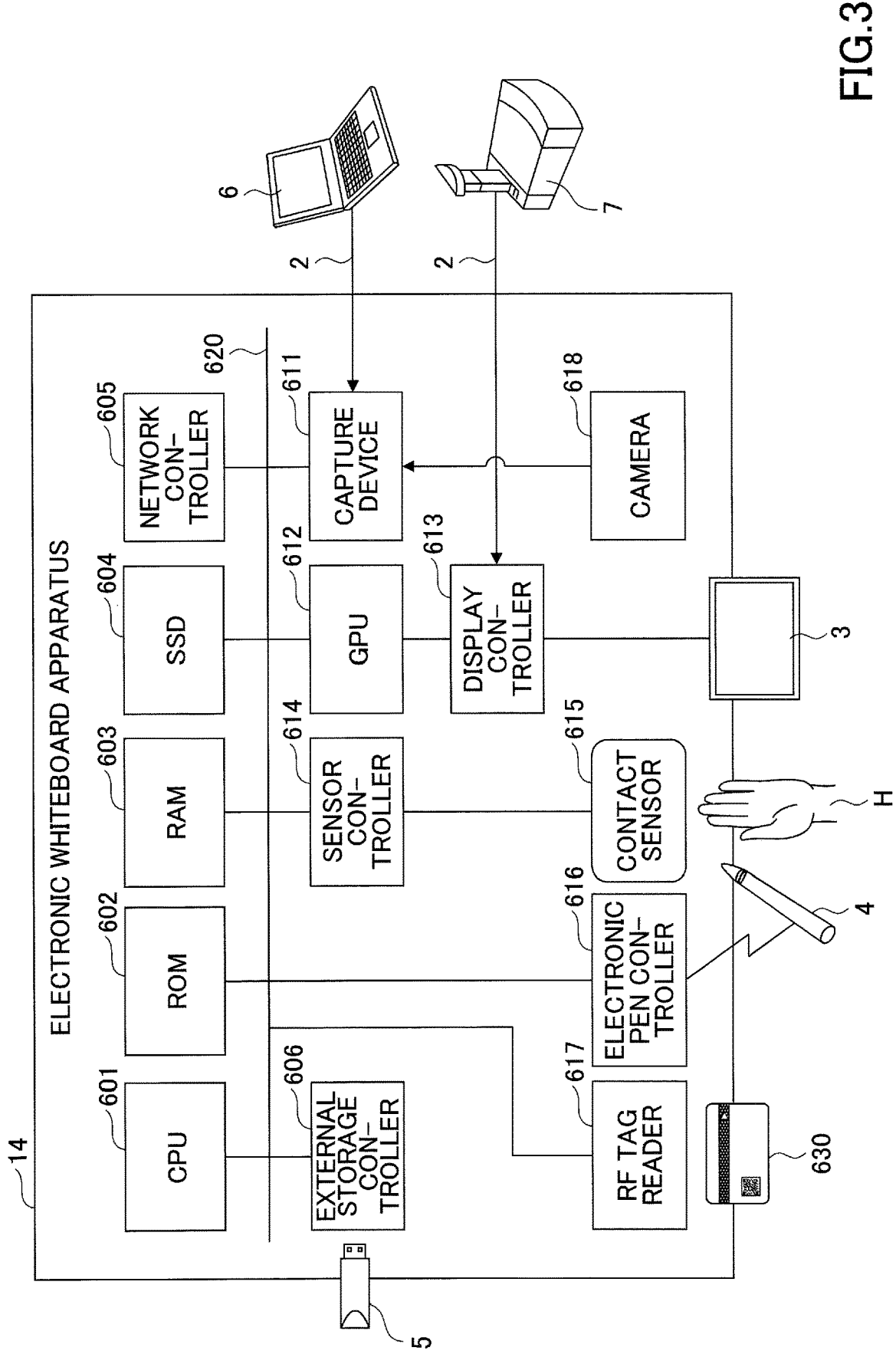
FIG. 3 is a diagram illustrating an example of a hardware configuration of an electronic whiteboard apparatus.

FIG. 3 is a diagram illustrating an example of a hardware configuration of the electronic whiteboard apparatus. The electronic whiteboard apparatus 14 includes a CPU 601, a ROM 602, a RAM 603, a SSD 604, a network controller 605, an external storage controller 606, a capture device 611, a graphics processing unit (GPU) 612, a display controller 613, a sensor controller 614, a contact sensor 615, an electronic pen controller 616, a RF tag reader 617, and a camera 618.

The CPU 601 controls the overall operation of the electronic whiteboard apparatus 14. The ROM 602 stores programs used to drive the CPU 601. The RAM 603 is used as a work area for the CPU 601. The SSD 604 stores various types of data such as a program for the electronic whiteboard apparatus 14. The network controller 605 controls communication with the network 16. The external storage controller 606 controls communication with a recording medium such as a USB memory 5.

As described above, the electronic whiteboard apparatus 14 includes the capture device 611, the GPU 612, the display controller 613, the sensor controller 614, the contact sensor 615, the electronic pen controller 616, the RF tag reader 617, and the camera 618.

The capture device 611 captures video information from a PC 6 or the camera 618 as a still image file or a moving image file. The GPU 612 is specifically used for graphics. The display controller 613 controls and manages display so as to output images from the GPU 612 to a display 3 and a teleconference terminal 7. The contact sensor 615 detects an electronic pen 4 or a user's hand H that has touched the display 3.

The contact sensor 615 inputs and detects coordinates by using an infrared ray blocking method. In the method of inputting and detecting coordinates, two light receiving/emitting devices, which are placed at both upper end portions of the display 3, emit a plurality of infrared rays in parallel to the display 3, the infrared rays are reflected by reflecting members placed around the display 3, and light receivers receive light returning along the same optical paths as those of the emitted infrared rays. The contact sensor 615 outputs, to the sensor controller 614, identification (ID) of the infrared rays emitted by the two light emitting/receiving devices and blocked by an object. The sensor controller 614 identifies a coordinate position that is a contact position of the object.

Further, the contact sensor 615 is not required to use the infrared ray blocking method. The contact sensor 615 may be any type of a detector, such as a capacitive type touch panel that identifies a contact position by detecting a change in electrostatic capacity, a resistive film type touch panel that identifies a contact position by a voltage change of two opposing resistive films, or an electromagnetic induction type touch panel that identifies a contact position by detecting electromagnetic induction caused when an object makes contact with a display part.

The electronic pen controller 616 communicates with the electronic pen 4 so as to determine whether the tip or the bottom of the pen has touched the display 3. Note that the electronic pen controller 616 may determine whether a part of the electronic pen 4 held by the user or other parts of the electronic pen 4 have touched the display 3.

The RF tag reader 617 reads identification information specific to an IC card 630 from a RF tag embedded in the IC card 630 via wireless communication. The RF tag reader 617 may be included in the electronic whiteboard apparatus 14 or may be externally attached to the electronic whiteboard apparatus 14. Note that the IC card 630 may be included in a smart device such as a smartphone. Further, the electronic whiteboard apparatus 14 may use any device other than the RF tag reader 617, as long as identification information capable of identifying a user can be obtained. For example, a biometric authentication device (such as a fingerprint, a palm print, or an iris authentication device) or a barcode reader may be used.

The electronic whiteboard apparatus 14 includes a bus line 620 such as an address bus and a data bus for electrically connecting the CPU 601, the ROM 602, the RAM 603, the SSD 604, the network controller 605, the external storage controller 606, the capture device 611, the GPU 612, the sensor controller 614, the electronic pen controller 616, and the RF tag reader 617 to each other. Note that the program for the electronic whiteboard apparatus may be recorded in a computer-readable recording medium such as a compact disc read-only memory (CD-ROM) for distribution.

(Functional Configuration of Information Processing System 1)

Figure 4:
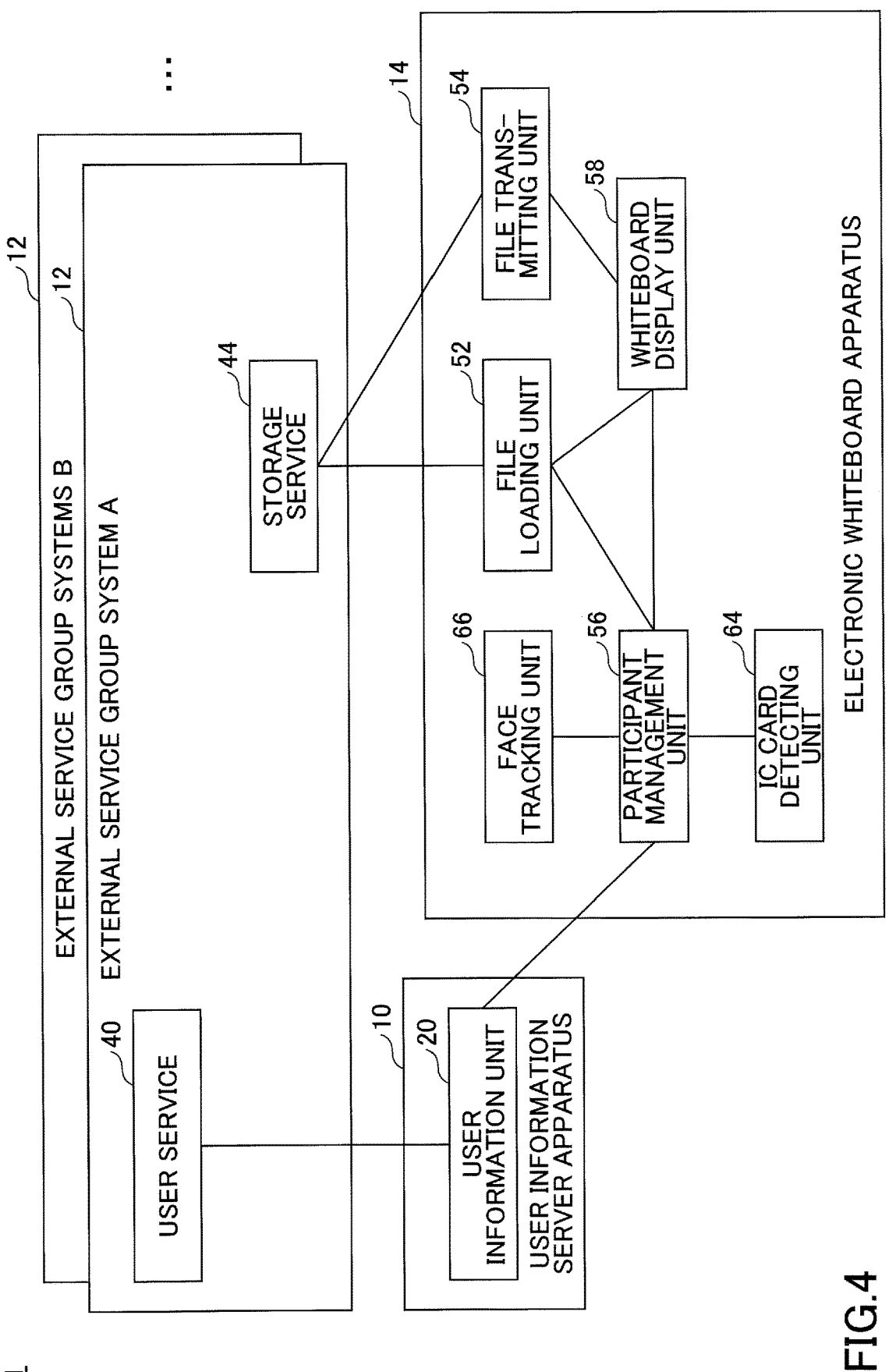
FIG. 4 is a diagram illustrating an example of a functional configuration of the information processing system according to the embodiment.

FIG. 4 is a diagram illustrating an example of a functional configuration of the information processing system according to the embodiment. In the functional configuration illustrated in FIG. 4, each of the external service group systems 12 include a user service 40 and a storage service 44.

The user service 40 stores service account information as illustrated in FIG. 5, for example. FIG. 5 is a table illustrating an example of service account information. The service account information of FIG. 5 includes a user ID, a name, and an email address of a user who uses a corresponding external service group system 12 (an external service user).

The storage service 44 stores and reads users' files. For example, the storage service 44 stores storage information as illustrated in FIG. 6. FIG. 6 is a table illustrating an example of storage information. The storage information illustrated in FIG. 6 includes an owner user of a file or a folder, a type (file or folder), and the name of the file or the folder. In this manner, the storage information manages a type (file or folder) and the name of a file or a folder on a per-user basis.

The user information server apparatus 10 includes a user information unit 20. The user information unit 20 stores a list of user information illustrated in FIG. 7, and a list of service information illustrated in FIG. 8. FIG. 7 is a table illustrating an example of the list of user information. FIG. 8 is a table illustrating an example of the list of service information.

The list of user information of FIG. 7 includes a user ID, a name, setting information, service information, and identification information of a user under management by the electronic whiteboard system (a user of the electronic whiteboard system). The list of service information of FIG. 8 is information that associates a user ID of a user of the electronic whiteboard system with an external service user ID. Further, the list of service information of FIG. 8 includes service information, a user ID of the electronic whiteboard system, address information, an external service user ID, and an external service authentication token.

The "service information" included in the list of user information is information for identifying service information from the list of service information. The "identification information" included in the list of user information is information for uniquely identifying the IC card 630. For example, identification information "ICCARD-123" illustrated in FIG. 7 is information for uniquely identifying the IC card 630 held by a user to which "user001" is assigned. By utilizing the list of user information of FIG. 7, service information of a user, who has been identified by identification information, can be identified from the list of service information of FIG. 8.

The list of service information of FIG. 8 is a list of service information used by users to utilize the external service group systems 12. In the list of service information, one user has an account (a user ID, a name, and an email address) for each external service group. That is, each user has one or more external service group accounts. For example, if one user uses two external service groups, two pieces of service information are associated with the one user. Namely, all account information of users who use the information processing system 1 can be uniquely identified from the list of service information, regardless of any external service group account. The "address information" and the "external service user IDs" are examples of connection information of the external service group systems 12. The "external service authentication tokens" are examples of authentication information of the external service group systems 12.

The electronic whiteboard apparatus 14 includes a file loading unit 52, a file transmitting unit 54, a participant management unit 56, a whiteboard display unit 58, an IC card detecting unit 64, and a face tracking unit 66.

The IC card detecting unit 64 is a function implemented by the RF tag reader 617. The IC card detecting unit 48 reads identification information from the IC card 630 of a user.

The participant management unit 56 transmits the identification information, read by the IC card detecting unit 64, to the user information server apparatus 10. Further, the participant management unit 56 obtains, from the user information unit 20 of the information server apparatus 10, service information of the user associated with the identification information. The participant management unit 56 transmits the service information, obtained from the user information unit 20, to the file loading unit 52 and the file transmitting unit 54.

The file loading unit 52 loads a file from a storage service 44 of a corresponding external service group system 12. The file loading unit 52 has a user interface (UI) allowing the user to select a file to be loaded from the storage service 44.

The file transmitting unit 54 stores a file (such as a file including handwritten contents displayed by the whiteboard display unit 58) in the storage service 44 by transmitting the file to the storage service 44. The file transmitting unit 54 has a UI allowing the user to select a folder in which to store a file.

The whiteboard display unit 58 is a function that displays various types of information on the display 3 (see FIG. 3). For example, the whiteboard display unit 58 displays, on the display 3, a file loaded by the file loading unit 52 from the storage service 44. Further, the whiteboard display unit 58 displays contents written by the user on the display 3.

The face tracking unit 66 track the faces of all users, who are registered on a list of participants, with respect to images captured by the camera 618 (see FIG. 3). For example, the face tracking unit 66 uses a known image recognition technique to track the face of each user based on feature information (see FIG. 9) representing facial feature points of each of the users. The camera 618 captures images in front of the electronic whiteboard apparatus 14. Accordingly, the camera 618 can capture an image that includes the face of each user who is in a place (such as a conference room) where the electronic whiteboard apparatus 14 is installed.

For example, when a user holds the IC card 630 over the RF tag reader 617, the face tracking unit 66 causes the camera 618 to capture an image of the user's face. Then, the face tracking unit 66 extracts feature points from the image of the user's face. The face tracking unit 66 associates feature point data of the user with a user ID of the user, and registers the feature point data on a list of feature point information (see FIG. 9). Specifically, the face tracking unit 66 registers feature point data of a user on the list of feature point information every time the user holds the IC card 630 over the face tracking unit 66; however, the present invention is not limited thereto. Feature point data of each user may be preliminarily associated with a corresponding user ID, and stored in the electronic whiteboard apparatus 14 and the user information server apparatus 10.

(Example of Feature Point Data)

FIG. 9 is a table illustrating an example of feature point information used by the electronic whiteboard apparatus 14. In the list of feature point information illustrated in FIG. 9, feature point data indicating facial feature points of each user, of a plurality of users, is associated with a corresponding user ID.

(Detailed Functional Configurations of Participant Management Unit 56 and Face Tracking Unit 66)

Figure 10A:
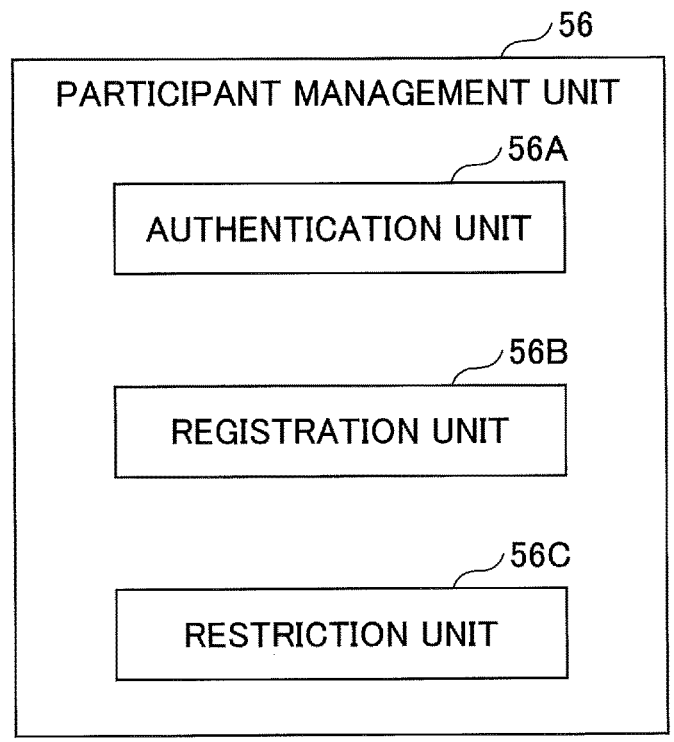
FIG. 10A and FIG. 10B are diagrams illustrating detailed functional configurations of a participant management unit and a face tracking unit.
Figure 10B:
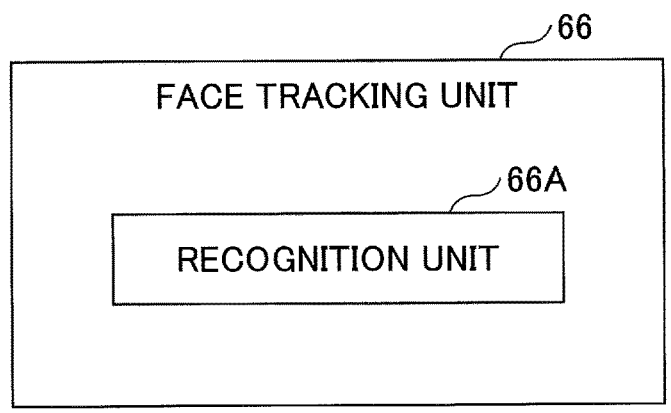

FIG. 10A is a diagram illustrating a detailed functional configuration of the participant management unit 56 according to the embodiment, and FIG. 10B is a diagram illustrating a detailed functional configuration of the face tracking unit 66 according to the embodiment. As illustrated in FIG. 10A and FIG. 10B, the participant management unit 56 includes an authentication unit 56A, a registration unit 56B, and a restriction unit 56C. Further, the face tracking unit 66 includes a recognition unit 66A.

The authentication unit 56A is an example of an "authentication means", and authenticates a user's login. Specifically, when identification information is read from the IC card 630 by the RF tag reader 617, the authentication unit 56A determines whether the identification information is valid. When the authentication unit 56A determines that the identification information is valid, the authentication unit 56A authenticates the user's login.

The registration unit 56B is an example of a "registration means", and registers, on a list of participants (see FIG. 11), participant information (see FIG. 11) indicating the authentication state of each user whose login has been authenticated by the authentication unit 56A. The list of participants is stored in a memory (such as the RAM 603 or the SSD 604 illustrated in FIG. 3) included in the electronic whiteboard apparatus 14.

The recognition unit 66A is an example of a "recognition means", and recognizes each of a plurality of users registered on the list of participants. For example, the recognition unit 66A obtains an image captured by the camera 618 at a predetermined time interval (such as at a 30-second interval), and detects a user's face from the image. The recognition unit 66A then determines the size of the detected user's face (in the image captured by the camera 618). Further, the recognition unit 66A determines whether each of a plurality of users registered on the list of participants has moved away from the electronic whiteboard apparatus 14, based on a detected result and a determined size of each of the users' faces.

Specifically, when a user's face is displayed in an image captured by the camera 618, and the size of the user's face displayed in the image captured by the camera 618 is greater than or equal to a predetermined size, the recognition unit 66A determines that the user is not away from the electronic whiteboard apparatus 14. In this case, the restriction unit 56C of the participant management unit 56 sets the authentication state of the user who is not away from the electronic whiteboard apparatus 14 to "Authenticated", and enables access to resources (files and folders stored in the storage service 44) owned by the user.

Conversely, when the size of the user's face displayed in the image captured by the camera 618 is less than the predetermined size (including the case where the user's face is not displayed in the image) a predetermined number of consecutive times (such as five consecutive times), the recognition unit 66A determines that the user is away from the electronic whiteboard apparatus 14. In this case, the restriction unit 56C of the participant management unit 56 sets the authentication state of the user who is away from the electronic whiteboard apparatus 14 to "Unauthenticated", and restricts access to resources (files and folders stored in the storage service 44) owned by the user.

The predetermined size of the user's face is preset as appropriate, based on the angle of view of the camera 618, the resolution of the camera 618, and the actual size of the user's face so that the distance between the electronic whiteboard apparatus 14 and the user's face is a predetermined distance. For example, if the predetermined distance between the electronic whiteboard apparatus 14 and the face of the user is 50 cm, the actual size of the user's face is 16 cm, the angle of view of the camera 618 is 120 degrees, and the resolution of the camera 618 is 1920 px, the predetermined size of the user's face can be calculated by the following formula.

$$\arctan(160 \text{ mm}/2/500 \text{ mm}) \text{radians} *2/(120 \text{ degrees}) *1920 \text{ px}$$

The restriction unit 56C is an example of a "restriction means", and restricts access to resources owned by a given user who is determined to satisfy a predetermined condition based on a recognition result of the recognition unit 66A, while allowing the user to remain registered on the list of participants. Specifically, if the recognition unit 66A determines that the user has moved away from the electronic whiteboard apparatus 14, the restriction unit 56C restricts access to resources owned by the user. In the present embodiment, "restriction of accessing resources owned by a user" by the restriction unit 56C includes restriction of reading files from folders owned by the user and storing the files in the folders owned by the user in the storage service 44.

(Example of List of Participants)

FIG. 11 is a table illustrating the list of participants used in the information processing system according to the embodiment. As illustrated in FIG. 11, participant information of each of a plurality of users is registered on the list of participants by the registration unit 56B. The participant information of each of the users includes a user ID of the electronic whiteboard system, a user name, an authentication state, the last authentication time, and a distribution destination.

When the face tracking unit 66 determines that a user has moved away from the electronic whiteboard apparatus 14, the participant management unit 56 sets the authentication state of the user to "Unauthenticated" in the list of participants.

Further, when the face tracking unit 66 determines that a user is not away from the electronic whiteboard apparatus 14, the participant management unit 56 sets the authentication state of the user to "Authenticated" in the list of participants.

Further, distribution email addresses are set for all the users on the list of participants, and a file is distributed to all the distribution email addresses at once.

(Outline of Process Performed by Information Processing System)

Figure 12A:
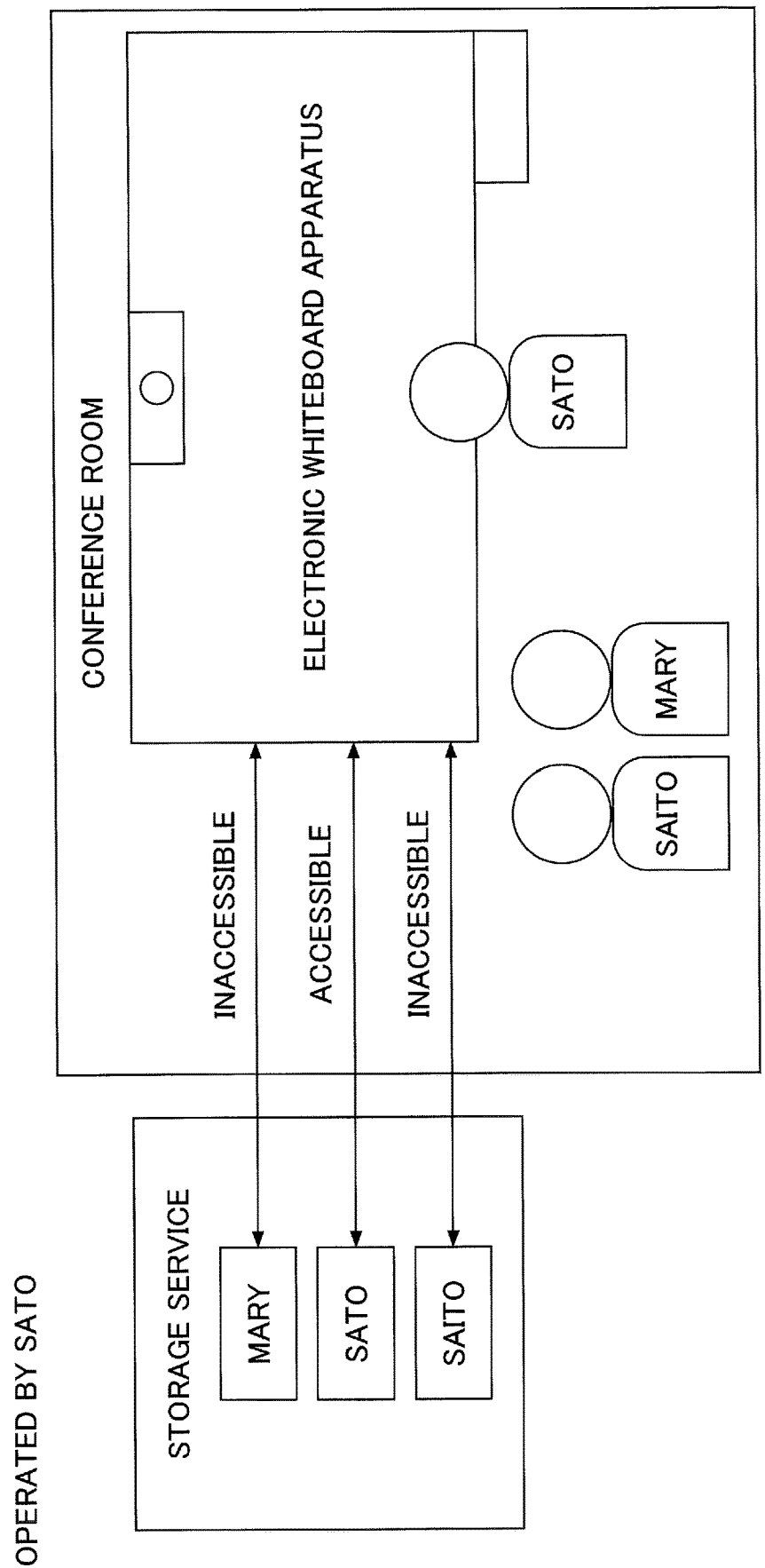
Figure 12C:
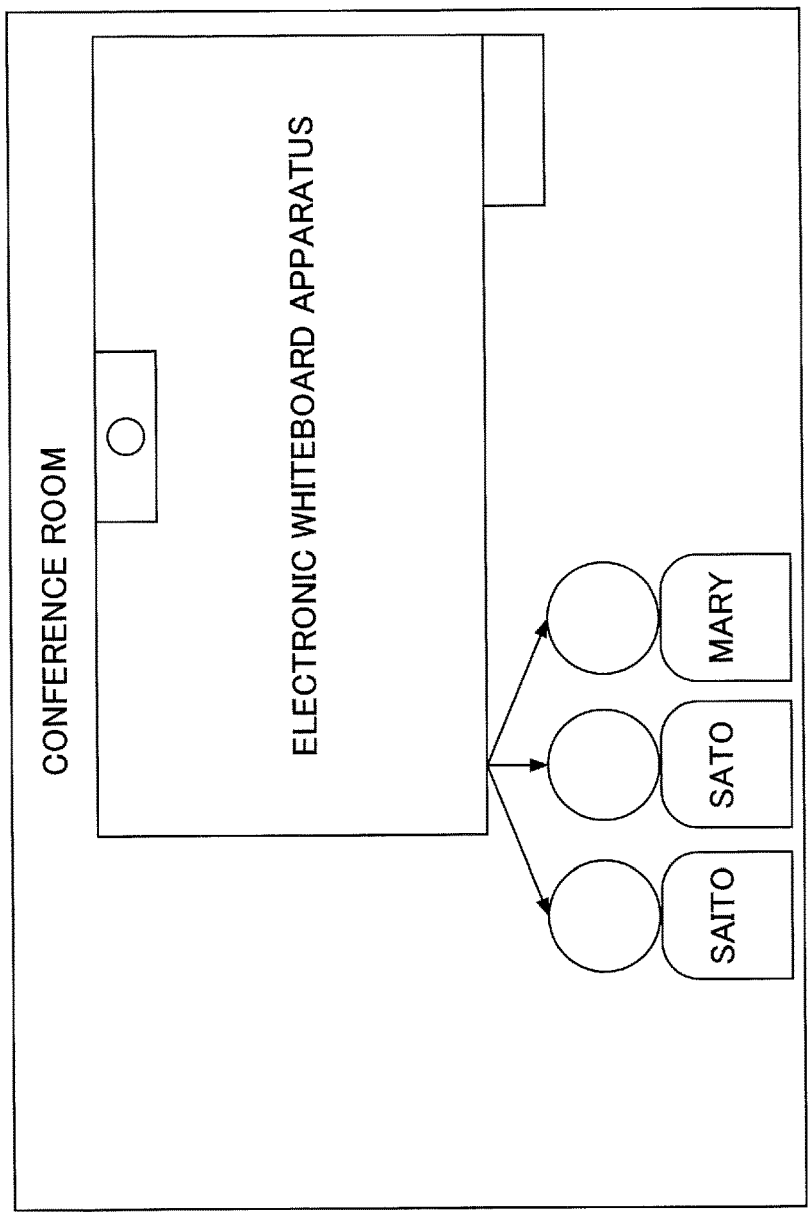

FIG. 12A through FIG. 12C are diagrams illustrating an outline of a process performed by the information processing system 1. In FIG. 12A through FIG. 12C, an example in which three users (Mary, Sato, and Saito) hold a conference by using the electronic whiteboard apparatus 14 will be described.

1. Users are each required to hold the IC card 630 over the RF tag reader 617 such that the users' logins are authenticated by the electronic whiteboard apparatus 14. Note that login authentication may be performed by any other method (such as a method for inputting a user ID and a password).

2. Upon the authentication of the users' logins, participant information of each of the users is registered on a list of participants. Accordingly, the users are identified as participants by the electronic whiteboard apparatus 14.

3. Upon the authentication of the users' logins, the users become able to access their own storage (including schedule services and site sharing services) of the storage service 44 from the electronic whiteboard apparatus 14 (namely, the users become able to read and save files).

4. When a user moves away from the electronic whiteboard apparatus 14 by a predetermined distance or more, the user's authentication state (login state) is automatically set to "Unauthenticated". An authenticated state means that the user remains logged in and is registered on the list of participants, and also the user's resources are available. An unauthenticated state means that the user remains logged in and is registered on the list of participants, but the user's resources are not available. Further, a logout state means that the user is not included in the list of participants or is removed from the list of participants after being registered, and the user's resources are not available.

5. When the user is in the unauthenticated state, the user's storage is inaccessible from the electronic whiteboard apparatus 14. Accordingly, if the user leaves a conference room, the user's storage is prevented from being accessed by other users without permission.

6. When the distance between the user and the electronic whiteboard apparatus 14 becomes less than the predetermined distance, the electronic whiteboard apparatus 14 automatically sets the user's authentication state to "Authenticated".

7. When the user is in the authenticated state, the user's storage is accessible from the electronic whiteboard apparatus 14.

For example, in FIG. 12A, the distance from the user "Sato" to the electronic whiteboard apparatus 14 is less than the predetermined distance. Thus, the user Sato's storage is accessible from the electronic whiteboard apparatus 14. Conversely, in FIG. 12A, the distances from the user "Mary" and from the user "Saito" to the electronic whiteboard apparatus 14 are greater than or equal to the predetermined distance. Thus, the user Mary's storage and the user Saito's storage are inaccessible from the electronic whiteboard apparatus 14.

Further, in FIG. 12B, the distance from the user "Mary" to the electronic whiteboard apparatus 14 is less than the predetermined distance. Thus, the user Mary's storage is accessible from the electronic whiteboard apparatus 14. Conversely, in FIG. 12B, the distances from the user "Sato" and from the user "Saito" to the electronic whiteboard apparatus 14 are greater than or equal to the predetermined distance. Thus, the user Sato's storage and the user Saito's storage are inaccessible from the electronic whiteboard apparatus 14.

8. As illustrated in FIG. 12C, when the conferences ends, the electronic whiteboard apparatus 14 may send a file, including handwritten contents displayed on the display 3, to email addresses of all users registered on the list of participants (namely, users in the unauthenticated state are included) by email (however, the present invention is not limited to email, and external storage or a file server may be used to send a file).

Note that the electronic whiteboard apparatus 14 does not distribute a file including handwritten contents to a user who has intentionally logged out. In addition, the electronic whiteboard apparatus 14 may distribute a file including handwritten contents to users (such as users included in a conference schedule) other than users whose logins have been authenticated.

As described above, in the information processing system 1 according to the embodiment, when a user moves away from the electronic whiteboard apparatus 14, the user's storage becomes automatically inaccessible from the electronic whiteboard apparatus 14. Thus, the information processing system 1 according to the embodiment prevents unauthorized access to a user's storage by other users when the user is away from the electronic whiteboard apparatus 14.

(Process Performed by Electronic Whiteboard Apparatus 14)

Figure 13:
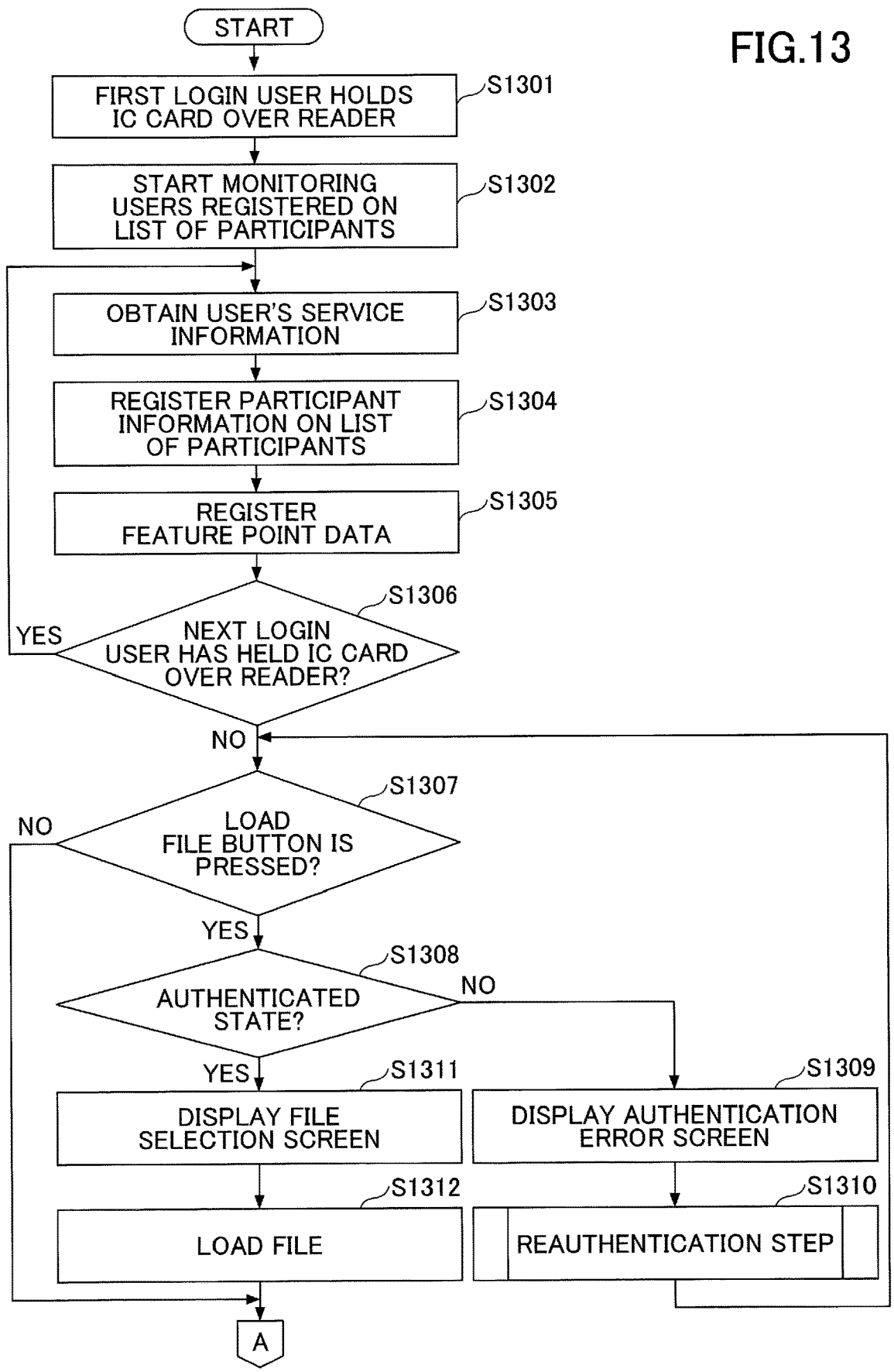
FIG. 13 is a flowchart of a process performed by the electronic whiteboard apparatus according to the embodiment.
Figure 14:
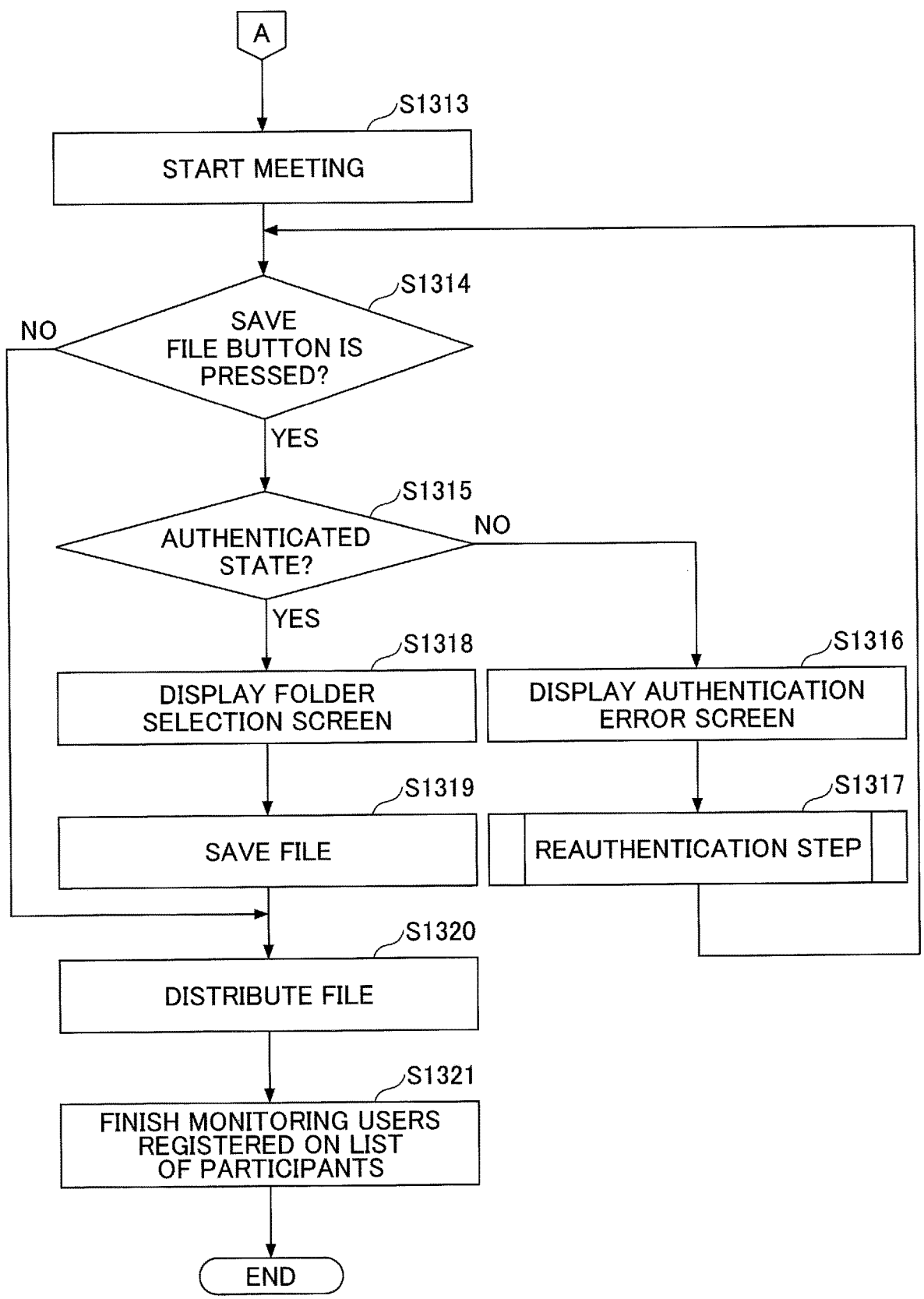
FIG. 14 is a flowchart of the process performed by the electronic whiteboard apparatus according to the embodiment.

FIG. 13 and FIG. 14 are a series of flowcharts of a process performed by the electronic whiteboard apparatus 14 according to the embodiment.

In the electronic whiteboard apparatus 14, the first login user holds the IC card 630 over the RF tag reader 617 (step S1301). At this time, the RE tag reader 617 reads identification information from the IC card 630.

Next, the face tracking unit 66 starts monitoring users registered on a list of participants (step S1302). Thereafter, the face tracking unit 66 determines whether each of the users registered on the list of participants has moved away from the electronic whiteboard apparatus 14. For users determined by the face tracking unit 66 not to be away from the electronic whiteboard apparatus 14, the participant management unit 56 sets the authentication state of the users to "Authenticated". For users determined by the face tracking unit 66 to be away from the electronic whiteboard apparatus 14, the participant management unit 56 sets the authentication state of the users to "Unauthenticated".

Next, the participant management unit 56 transmits the identification information, read by the IC card 630, to the user information server apparatus 10, and obtains, from the information server apparatus 10, service information of the user associated with the identification information (step S1303).

For example, if the identification information read by the IC card 630 is "ICCARD-123", user ID "user001" associated with the identification information is identified from the list of user information of FIG. 7. Then, the participant management unit 56 obtains, from among service information illustrated in FIG. 8, service information "Service11" and service information "Service12", which are associated with the user ID "user001". FIG. 15 is a table illustrating an example of service information obtained by the participant management unit 56 according to the embodiment.

Next, the registration unit 56B of the participant management unit 56 registers, on the list of participants, participant information (a user ID of the electronic whiteboard system, a user name, an authentication state, the last authentication time, and a distribution destination) of the user associated with the identification information read by the IC card 630 (step S1304).

Next, the face tracking unit 66 associates feature point data with the user ID, and registers the feature point data on the list of feature point information (step S1305). The feature point data indicates feature points of the face of the user associated with the identification information read by the IC card 630. Specifically, the camera 618 captures an image of the user's face located closest to the camera 618. Next, the face tracking unit 66 extracts feature points of the user from the image captured by the camera 618. Further, the face tracking unit 66 associates feature point data indicating the extracted feature points of the user's face with the user ID, and registers the feature point data on the list of feature point information. Next, the face tracking unit 66 uses the registered feature point data to start tracking the user's face.

Next, the participant management unit 56 determines whether the next login user has held the IC card 630 over the RF tag reader 617 (step S1306). In step S1306, when it is determined that the next login user has held the IC card 630 over the RF tag reader 617 (yes in step S1306), the electronic whiteboard apparatus 14 causes the process to return to step S1303, and obtains service information, registers participant information, and registers feature point data of the next login user.

Conversely, in step S1306, when it is determined that the next login user has not held the IC card 630 over the RF tag reader 617 (no in step S1306), the electronic whiteboard apparatus 14 causes the process to proceed to step S1307.

In step S1307, the file loading unit 52 determines whether a Load File button 1320 is pressed on any of individual information display screens 1300 (see FIG. 19) displayed on the display 3 of the electronic whiteboard apparatus 14 on a per-user basis. In step S1307, when it is determined that no "Load File" button 1320 is pressed (no in step S1307), the electronic whiteboard apparatus 14 causes the process to proceed to step S1313.

Conversely, in step S1307, when it is determined that any "Load File" button 1320 is pressed (yes in step S1307), the file loading unit 52 checks participant information of a user who has pressed the "Load File" button 1320 by referring to the list of participants, and determines whether the user is in the authenticated state (step S1308).

In step S1308, when it is determined that the user is not in the authenticated state (no in S1308), the file loading unit 52 causes the whiteboard display unit 58 to display an authentication error screen 1400 (see FIG. 20) on the display 3 of the electronic whiteboard apparatus 14 (step S1309). Then, a predetermined reauthentication step is performed (step S1310). The electronic whiteboard apparatus 14 causes the process to return to S1307.

In the predetermined reauthentication step, a screen prompting the user, who is the owner of storage, to perform an operation himself/herself is displayed on the display 3, or the authentication state of the user, who is the owner of storage, is set to "Authenticated" when the user approaches the electronic whiteboard apparatus 14. In the example of FIG. 13, the process returns to step S1307 after the reauthentication step; however, the present invention is not limited thereto. For example, if the authentication state of the user, who is the owner of storage, is set to "Authenticated" in the reauthentication step, the process may proceed to step S1311, and the file loading unit 52 may display a file selection screen on the display 3.

Figure 17:
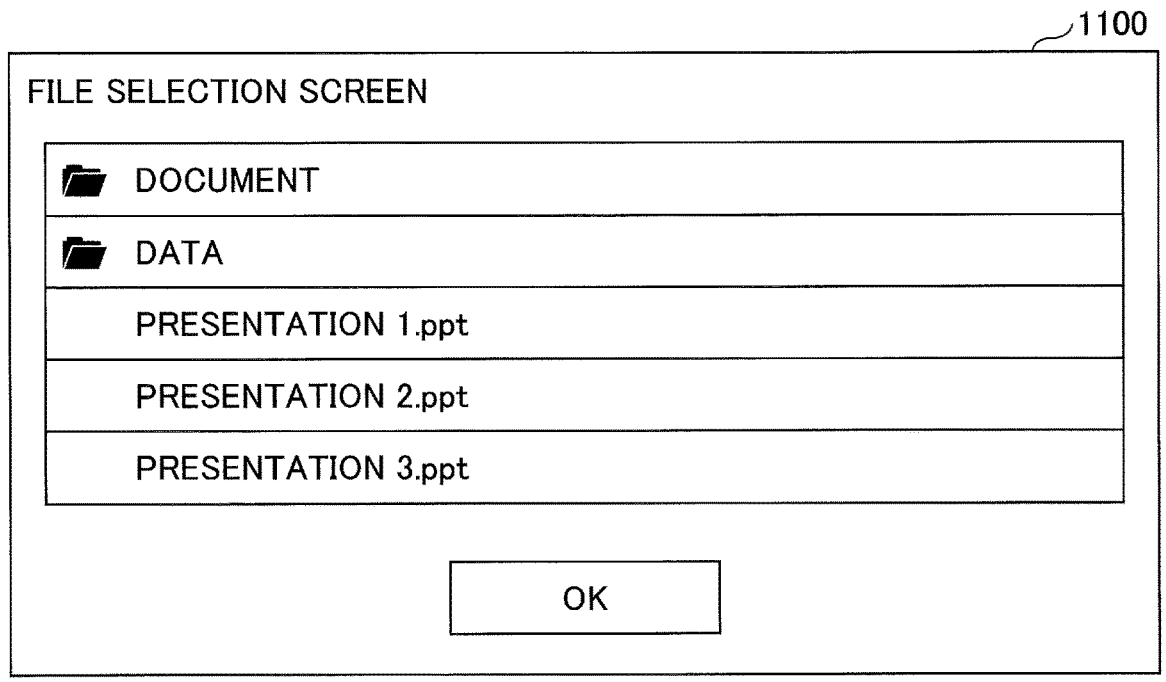
FIG. 17 is a diagram illustrating an example of a file selection screen displayed on a display of the electronic whiteboard apparatus according to the embodiment.

Conversely, in step S1308, when it is determined that the user is in the authenticated state (yes in step S1308), the file loading unit 52 causes the whiteboard display unit 58 to display a file selection screen 1100 illustrated in FIG. 17 on the display 3 of the electronic whiteboard apparatus 14 (step S1311).

FIG. 17 is a diagram illustrating an example of a file selection screen displayed on the display 3 of the electronic whiteboard apparatus 14 according to the embodiment. The file selection screen 1100 is a screen on which a user, who has pressed the Load File button 1320, selects a folder and a file to be loaded from the user's own storage of the storage service 44.

Next, the file loading unit 52 loads the file selected on the file selection screen 1100 from the storage service 44, and causes the whiteboard display unit 58 to display the file on the display 3 of the electronic whiteboard apparatus 14 (step S1312). The electronic whiteboard apparatus 14 causes the process to proceed to step S1313.

In step S1313, the multiple users registered on the list of participants start a meeting by using the electronic whiteboard apparatus 14. In the meeting, all the users are permitted to write on the electronic whiteboard apparatus 14.

Next, the file transmitting unit 54 determines whether a Save File button 1330 is pressed on any of individual information display screens 1300 (see FIG. 19) displayed on the display 3 of the electronic whiteboard apparatus 14 on a per-user basis (step S1314). In step S1314, when it is determined that no Save File button 1330 is pressed (no in step S1314), the electronic whiteboard apparatus 14 causes the process to proceed to step S1320.

Conversely, when it is determined that any Save File button 1330 is pressed (yes in step S1314), the file transmitting unit 54 checks participant information of a user who has pressed the Save File button 1330 by referring to the list of participants, and determines whether the user is in the authenticated state (step S1315).

In step S1315, when it is determined that the user is not in the authenticated state (no in step S1315), the file transmitting unit 54 causes the whiteboard display unit 58 to display the authentication error screen 1400 (see FIG. 20) on the display 3 of the electronic whiteboard apparatus 14 (step S1316), and a predetermined reauthentication process similar to step S1310 is performed (step S1317). Then, the electronic whiteboard apparatus 14 causes the process to return to step S1314.

Conversely, in step S1315, when it is determined that the user is in the authenticated state (yes in step S1315), the file transmitting unit 54 causes the whiteboard display unit 58 to display a folder selection screen 1200 on the display 3 of the electronic whiteboard apparatus 14 (step S1318).

Figure 18:
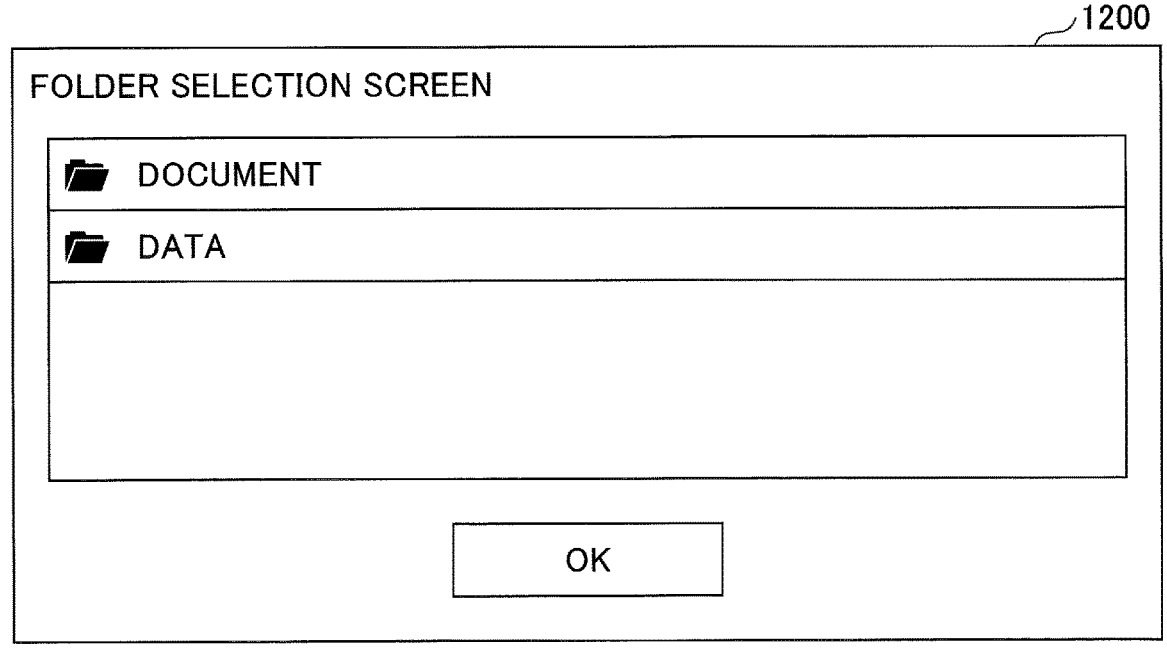
FIG. 18 is a diagram illustrating an example of a folder selection screen displayed on the display of the electronic whiteboard apparatus according to the embodiment.

FIG. 18 is a diagram illustrating an example of the folder selection screen displayed on the display 3 of the electronic whiteboard apparatus 14 according to the embodiment. The folder selection screen 1200 illustrated in FIG. 18 is a screen on which a user, who has pressed the Save File button, selects a folder in which to save a file, when saving the file in the own storage of the storage service 44.

Next, the file transmitting unit 54 saves the file including handwritten contents displayed on the electronic whiteboard apparatus 14 in the folder selected on the folder selection screen 1200 (step S1319). The electronic whiteboard apparatus 14 causes the process to proceed to step S1320.

In step S1320, when an End Meeting button 1500 (see FIG. 19) is pressed by a user, the file transmitting unit 54 distributes the file, including the handwritten contents displayed on the electronic whiteboard apparatus 14, to email addresses (included as distribution destinations in the list of participants) of all the users registered on the list of participants (namely including users in the unauthenticated state) at once.

The face tracking unit 66 finishes monitoring the users registered on the list of participants (step S1321). Then, the information processing system 1 ends the process illustrated in FIG. 13 and FIG. 14.

Note that when the End Meeting button 1500 is pressed by the user, the electronic whiteboard apparatus 14 causes all the users who have logged in with the IC card 630 to log off. Further, when the End Meeting button 1500 is pressed by the user, the electronic whiteboard apparatus 14 clears all values set in the list of participants. Further, when the End Meeting button 1500 is pressed by the user, the electronic whiteboard apparatus 14 clears the handwritten contents displayed on the display 3 of the electronic whiteboard apparatus 14. Further, when the End Meeting button 1500 is pressed by the user, the electronic whiteboard apparatus 14 may enter sleep mode or may be turned off.

(Recognition Process Performed by Face Tracking Unit 66)

Figure 16:
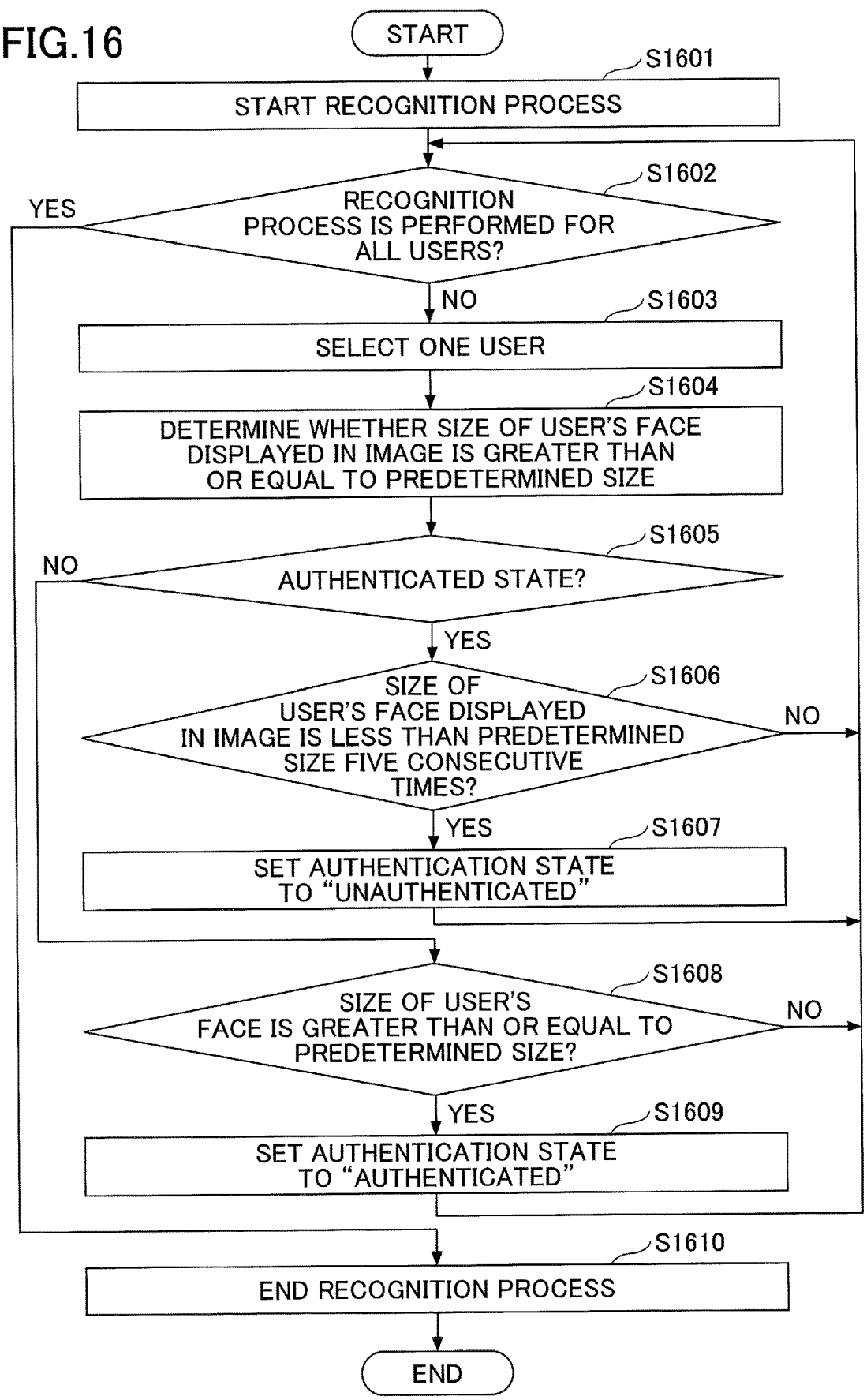
FIG. 16 is a flowchart of a recognition process performed by a face tracking unit according to the embodiment.

FIG. 16 is a flowchart of a recognition process performed by the face tracking unit 66 according to the embodiment. For example, the face tracking unit 66 performs the recognition process illustrated in FIG. 16 at predetermined time intervals (such as at 30-minute intervals).

First, the face tracking unit 66 of the electronic whiteboard apparatus 14 starts the recognition process (step S1601). Next, the face tracking unit 66 determines whether the recognition process is performed for all users registered on a list of participants (step S1602).

In step S1602, when it is determined that the recognition process is performed for all the users (yes in step S1602), the face tracking unit 66 of the electronic whiteboard apparatus 14 ends the recognition process (step S1610) illustrated in FIG. 16. The face tracking unit 66 ends the entire process illustrated in FIG. 16.

Conversely, in step S1602, when it is determined that the recognition process is not performed for all the users (no in step S1602), the face tracking unit 66 selects one user for which the recognition process has not been performed yet (step S1603). Then, the face tracking unit 66 determines whether the size of the selected user's face displayed in an image captured by the camera 618 is greater than or equal to the predetermined size (step S1604).

Next, the face tracking unit 66 determines whether the user selected in step S1603 is in the authenticated state by referring to the list of participants (step S1605).

In step S1605, when it is determined that the user selected in step S1603 is in the authenticated state, the face tracking unit 66 determines whether the user satisfies the condition that the size of the user's face displayed in an image is less than the predetermined size five consecutive times (step S1606).

In step S1606, when it is determined that the above-described condition is not satisfied (no in step S1606), the face tracking unit 66 causes the process to return to step S1602. Conversely, in step S1606, when it is determined that the above-described condition is satisfied (yes in step S1606), the face tracking unit 66 sets the authentication state of the user selected in step S1603 to "Unauthenticated" (step S1607). Then, the face tracking unit 66 causes the process to return to step S1602.

In step S1605, when it is determined that the user selected in step S1603 is not in the authenticated state (no in step S1605), the process proceeds to step S1608.

In step S1608, when the size of the user's face displayed in the image is not greater than or equal to the predetermined size (no in step S1608), the face tracking unit 66 causes the process to return to step S1602.

Conversely, in step S1608, when the size of the user's face displayed in the image is greater than or equal to the predetermined size (yes in step S1608), the face tracking unit 66 sets the authentication state of the user selected in step S1603 to "Authenticated" (step S1609). Then, the face tracking unit 66 causes the process to return to step S1602.

(Examples of Individual Information Display Screens and Authentication Error Screen)

Figure 19:
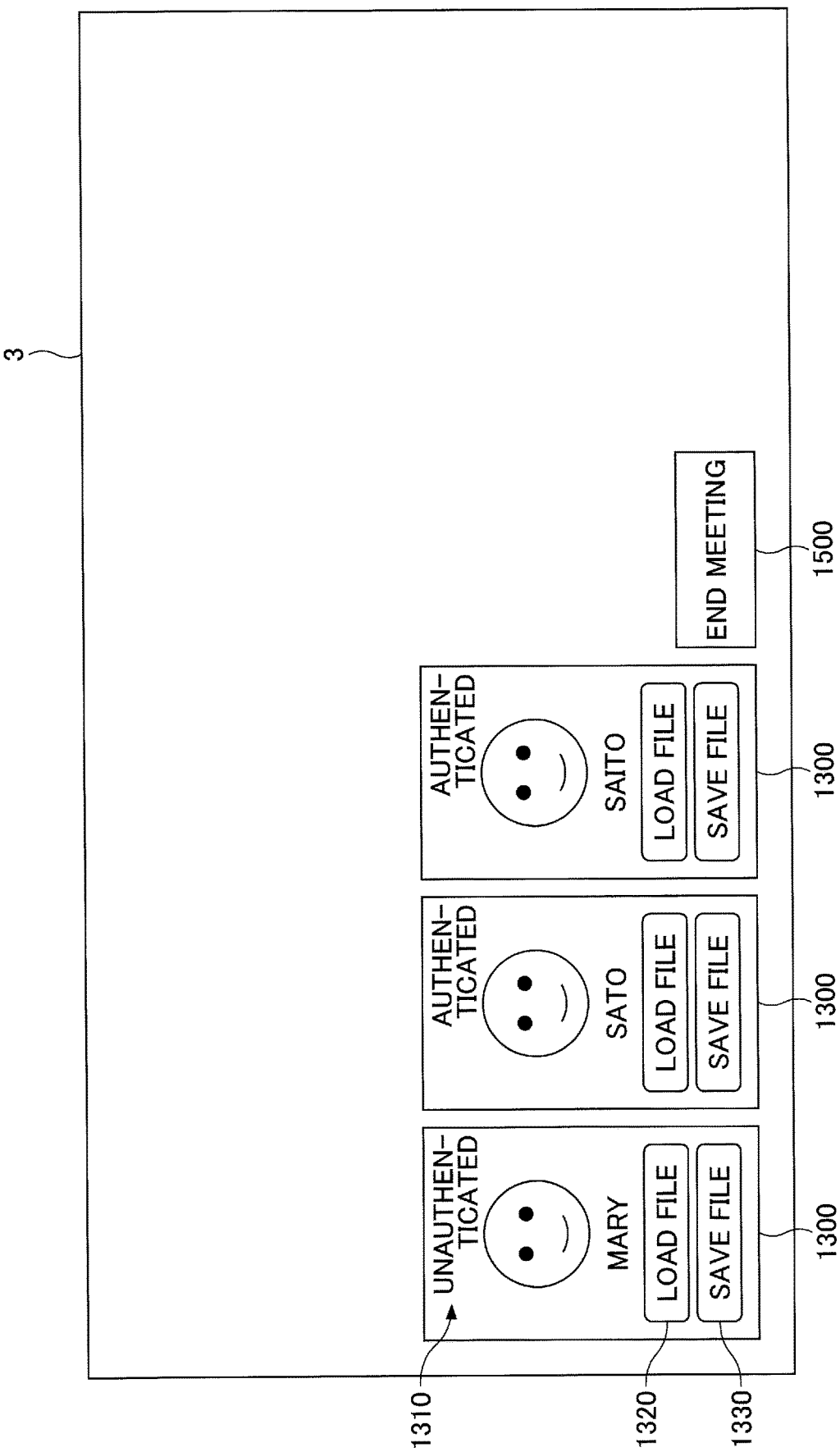
FIG. 19 is a diagram illustrating examples of individual information display screens displayed on the display of the electronic whiteboard apparatus according to the embodiment.
Figure 20:
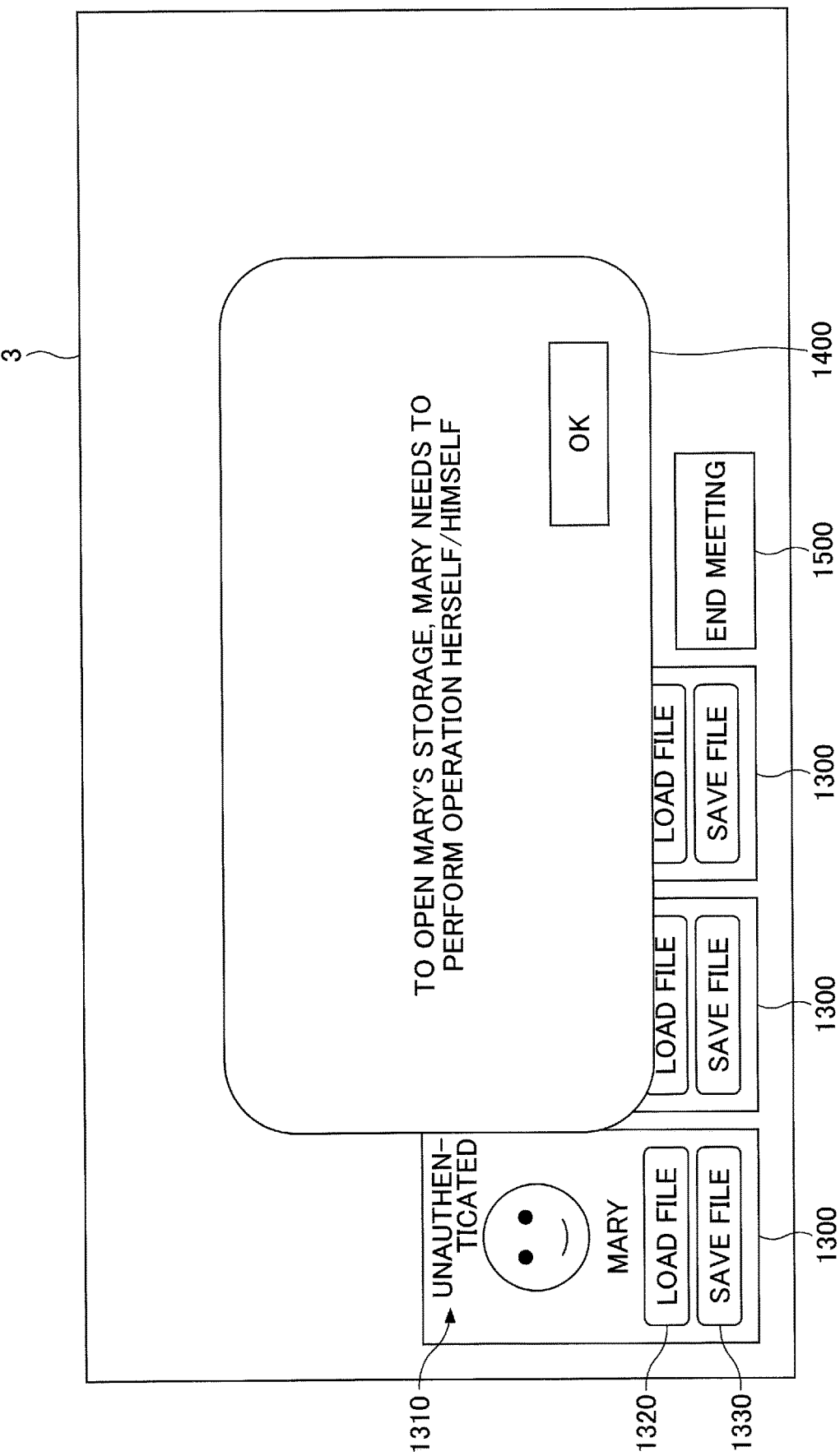
FIG. 20 is a diagram illustrating an example of an authentication error screen displayed on the display of the electronic whiteboard apparatus according to the embodiment.

FIG. 19 is a diagram illustrating examples of individual information display screens displayed on the display 3 of the electronic whiteboard apparatus 14 according to the embodiment. FIG. 20 is a diagram illustrating an example of the authentication error screen displayed on the display 3 of the electronic whiteboard apparatus 14 according to the embodiment.

In FIG. 19, the individual information display screens 1300 are displayed on the display 3 of the electronic whiteboard apparatus 14 for the respective users (Mary, Sato, and Saito) registered on the list of participants. Each of the individual information display screens 1300 includes a login authentication state 1310, a Load File button 1320 and a Save File button 1330. Further, each of the individual information display screens 1300 may include a logout button for removing a user from the list of participants. When the logout button is pressed on an individual information display screen 1300, the individual information display screen 1300 is hidden from the display area.

The login authentication state 1310 displays a login authentication state of a corresponding user. For example, when the user is in the authenticated state (namely when the authentication state of the user is set to "Authenticated" in the list of participants), the login authentication state 1310 indicates "Authenticated". When the user is in an unauthenticated state (namely when the authentication state of the user is set to "Unauthenticated" in the list of participants), the login authentication state 1310 indicates "Unauthenticated".

The login authentication state 1310 is an example of "information enabling identification of whether access to a resource is restricted. However, the "information enabling identification of whether access to a resource is restricted" may be any other information such as a character string, an image, a symbol, or a figure, as long as login authentication state is identifiable.

The Load File button 1320 is pressed by a corresponding user when the user loads a file from the user's storage of the storage service 44. When the Load File button 1320 is pressed, the file selection screen 1100 (see FIG. 17) is displayed on the display 3 of the electronic whiteboard apparatus 14. However, if the corresponding user is in the unauthenticated state, loading the file from the user's storage is prohibited, and the authentication error screen 1400 is displayed on the display 3 of the electronic whiteboard apparatus 14, as illustrated in FIG. 20. A message prompting the owner of storage to perform an operation himself/herself is displayed on the authentication error screen 1400, as illustrated in FIG. 20.

The Save File button 1330 is pressed by a corresponding user when the user saves a file in the user's storage of the storage service 44. When the Save File button 1330 is pressed, the folder selection screen 1200 (see FIG. 18) is displayed on the display 3 of the electronic whiteboard apparatus 14. However, if the corresponding user is in the unauthenticated state, saving the file in the user's storage is prohibited, and the authentication error screen 1400 is displayed on the display 3 of the electronic whiteboard apparatus 14, as illustrated in FIG. 20.

Note that the individual information display screens 1300 may each include a logoff button allowing a user to log off on purpose.

Further, in FIG. 19, the End Meeting button 1500 is displayed on the display 3 of the electronic whiteboard apparatus 14. When the End Meeting button 1500 is pressed by a user, the meeting using the electronic whiteboard apparatus 14 ends, and a file including handwritten contents displayed on the display 3 is transmitted to email addresses of all the users registered on the list of participants (namely including users in the unauthenticated state are) at once.

(Process Sequences Performed by Electronic Whiteboard Apparatus 14)

Figure 21:
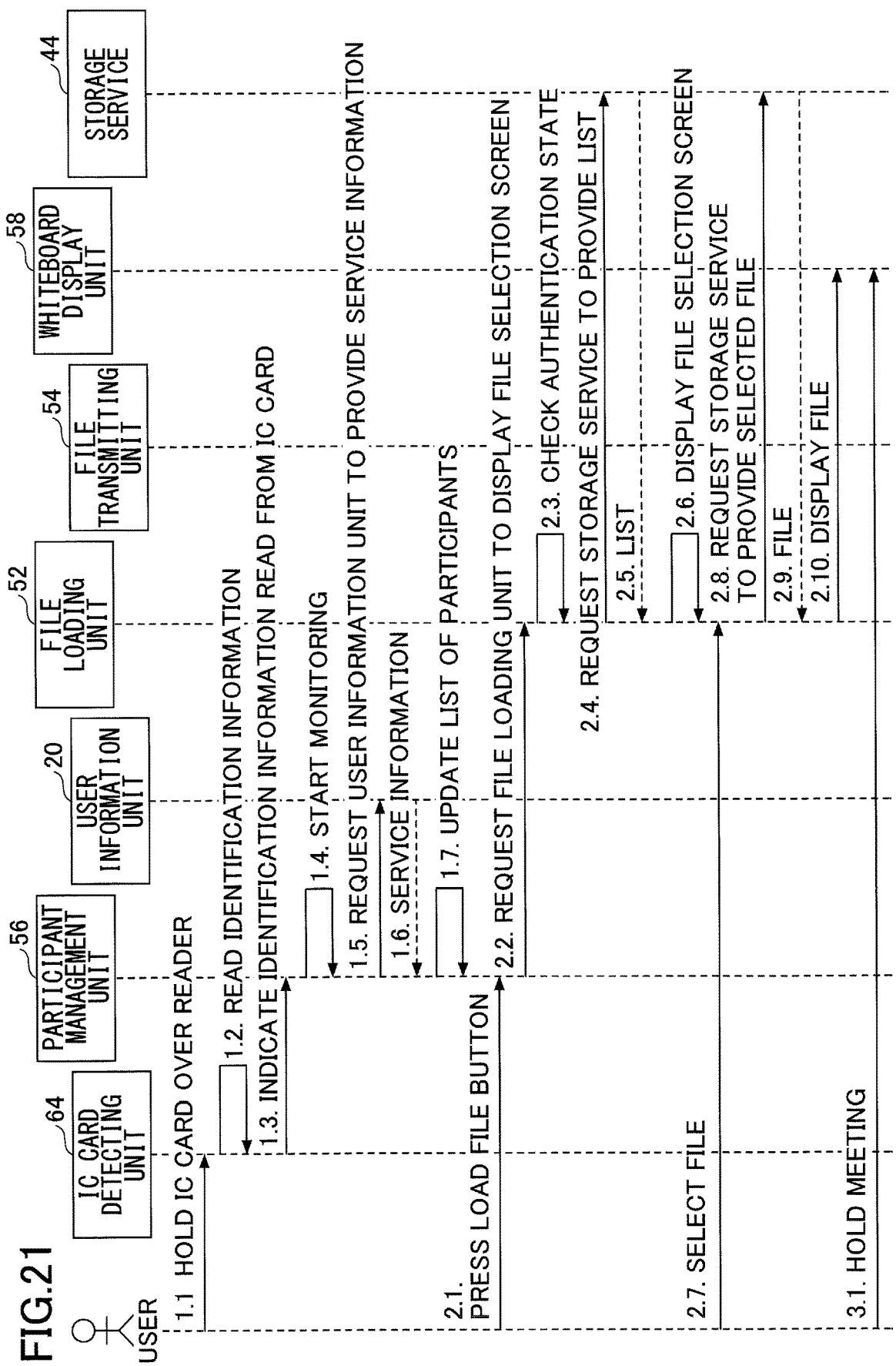
FIG. 21 is a diagram illustrating a process performed by the electronic whiteboard apparatus according to the embodiment.
Figure 22:
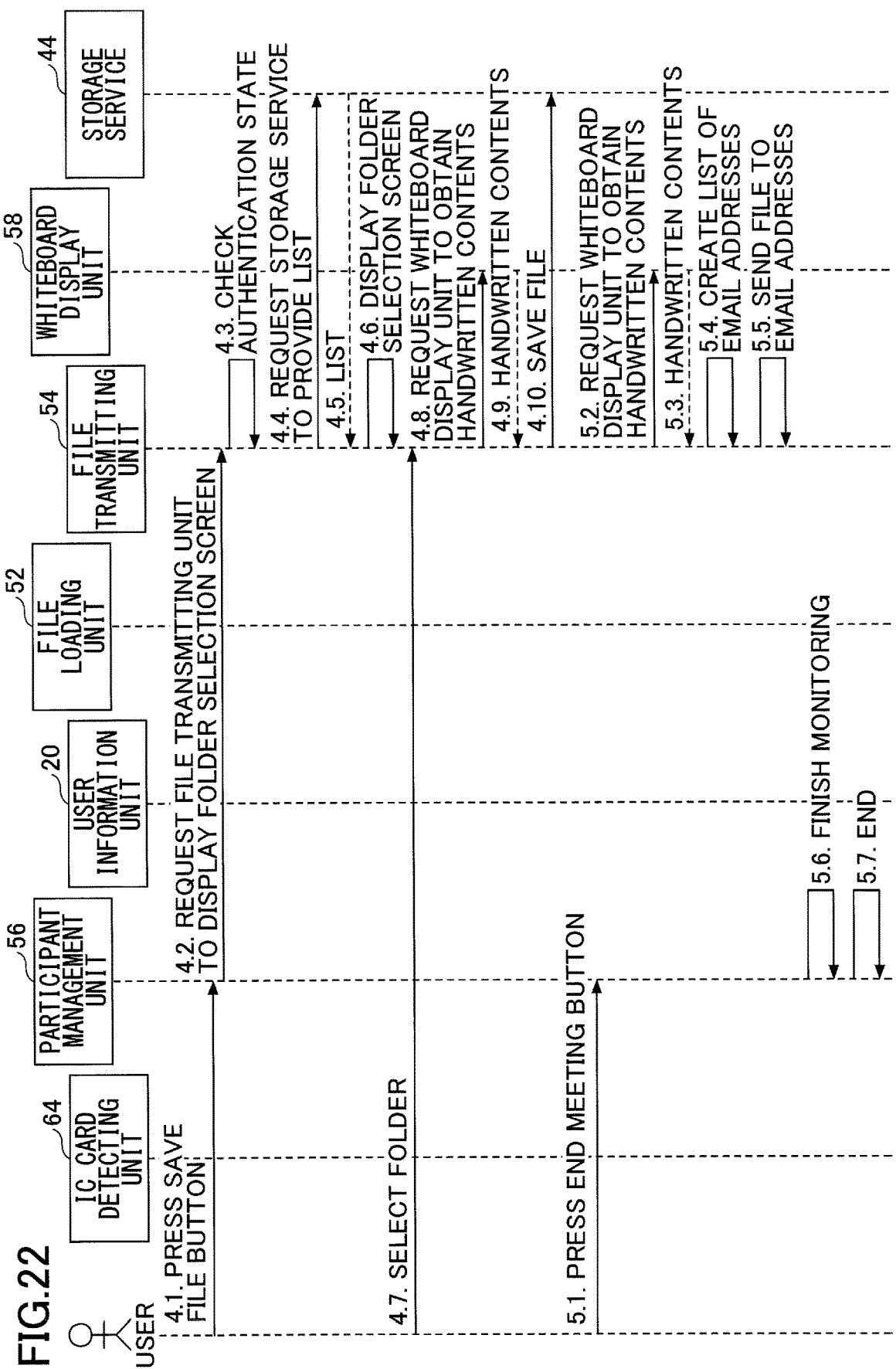
FIG. 22 is a diagram illustrating the process performed by the electronic whiteboard apparatus according to the embodiment.

FIG. 21 and FIG. 22 are diagrams illustrating process sequences performed by the electronic whiteboard apparatus 14 according to the embodiment.

<Sequences 1.1 to 1.7>

In the electronic whiteboard apparatus 14, first, a user holds the IC card 630 over the RF tag reader 617 (IC card detecting unit 64) (sequence 1.1). At this time, the RF tag reader 617 reads identification information from the IC card 630 (sequence 1.2).

Next, the IC card detecting unit 64 indicates the identification information, read from the IC card 630 by the IC card detecting unit 64, to the participant management unit 56 (sequence 1.3). Next, the participant management unit 56 starts monitoring users on a list of participants (sequence 1.4)

Next, the participant management unit 56 transmits the identification information, received from the IC card detecting unit 64, to the user information unit 20 of the user information server apparatus 10, thereby requesting the user information unit 20 to provide service information (sequence 1.5). As a result, the participant management unit 56 obtains the service information from the user information unit 20 (sequence 1.6).

Next, the participant management unit 56 (registration unit 56B) registers, on the list of participants, participant information (a user ID of the electronic whiteboard system, a user name, an authentication state, a last authentication time, and a distribution destination) of the user associated with the identification information received from the IC card detecting unit 64 (sequence 1.7).

<Sequences 2.1 to 2.10>

Subsequently, the user presses a Load File button on a corresponding individual information display screen 1300 (see FIG. 19) displayed on the display 3 of the electronic whiteboard apparatus 14 (sequence 2.1). In this case, the participant management unit 56 transmits the service information obtained in sequence 1.6 to the file loading unit 52, thereby requesting the file loading unit 52 to display the file selection screen (sequence 2.2).

In response to the above, the file loading unit 52 checks the authentication state of the user (sequence 2.3) by referring to the user's participant information included in the list of participants. If the authentication state of the user is set to "Authenticated", the file loading unit 52 requests the storage service 44 to provide a list of files and folders (sequence 2.4). At this time, the file loading unit 52 uses an external service authentication token, included in the service information obtained from the participant management unit 56, to access the storage service 44. As a result, the file loading unit 52 receives the list of files and folders transmitted from the storage service 44 (sequence 2.5).

Next, the file loading unit 52 displays the file selection screen 1100 (see FIG. 17) including the list of files and folders on the display 3 (sequence 2.6).

Subsequently, when the user selects a file on the file selection screen 1100 (sequence 2.7), the file loading unit 52 requests the storage service 44 to provide the selected file (sequence 2.8). At this time, the file loading unit 52 uses the external service authentication token, included in the service information obtained from the participant management unit

56, to access the storage service 44. The file loading unit 52 receives the file transmitted from the storage service 44 (sequence 2.9). Further, the file loading unit 52 causes the whiteboard display unit 58 to display the file obtained in sequence 2.9 on the display 3 (sequence 2.10).

<Sequence 3.1>

Subsequently, the multiple users registered on the list of participants hold a meeting by using the electronic whiteboard apparatus 14 (Sequence 3.1). In this meeting, all the users are permitted to write on the electronic whiteboard apparatus 14.

<Sequences 4.1 to 4.10>

Subsequently, the user presses a Save File button on the corresponding individual information display screen 1300 (see FIG. 19) (sequence 4.1). In this case, the participant management unit 56 transmits the service information obtained in sequence 1.6 to the file transmitting unit 54, thereby requesting the file transmitting unit 54 to display the folder selection screen (sequence 4.2).

In response to the above, the file transmitting unit 54 checks the authentication state of the user by referring to the user's participant information included in the list of participants (sequence 4.3). If the user's authentication state is set to "Authenticated", the file transmitting unit 54 requests the storage service 44 to provide a list of folders (sequence 4.4). At this time, the file transmitting unit 54 uses the external service authentication token, included in the service information obtained from the participant management unit 56, to access the storage service 44. As a result, the file transmitting unit 54 receives the list of folders transmitted from the storage service 44 (sequence 4.5).

Next, the file transmitting unit 54 displays the folder selection screen 1200 (see FIG. 18) including the list of folders obtained in sequence 4.5 on the display 3 (sequence 4.6).

Subsequently, when a folder is selected by the user on the folder selection screen 1200 (sequence 4.7), the file transmitting unit 54 requests the whiteboard display unit 58 to obtain handwritten contents displayed on the display 3 (sequence 4.8). As a result, the file transmitting unit 54 receives the handwritten contents transmitted from the whiteboard display unit 58 (sequence 4.9). Then, the file transmitting unit 54 saves, in the selected folder of the storage service 44, a file including the handwritten contents obtained in sequence 4.9 (sequence 4.10). At this time, the file transmitting unit 54 uses the external service authentication token, included in the service information obtained from the participant management unit 56, to access the storage service 44.

<Sequences 5.1 to 5.7>

Subsequently, when the user presses the End Meeting button 1500 (see FIG. 19) (sequence 5.1), the file transmitting unit 54 requests the whiteboard display unit 58 to obtain handwritten contents displayed on the display 3. The file transmitting unit 54 receives the handwritten contents transmitted from the whiteboard display unit 58 (sequence 5.3).

The file transmitting unit 54 creates a list of email addresses of all the users registered on the list of participants (namely including email addresses of users in the unauthenticated state) (sequence 5.4). The file transmitting unit 54 sends a file including the handwritten contents obtained in sequence 5.3 to the list of email addresses (sequence 5.5).

Subsequently, the face tracking unit 66 finishes monitoring the users on the list of participants (sequence 5.6). Further, the participant management unit 56 performs a predetermined end process (including a process for causing all the users who have logged in with the IC card 630 to log off, clearing all values set in the list of participants, removing handwritten contents displayed on the display 3 of the whiteboard display unit 58, and entering sleep mode or turning the power off (sequence 5.7)).

(Sequence of Recognition Process Performed by Face Tracking Unit 66)

Figure 23:
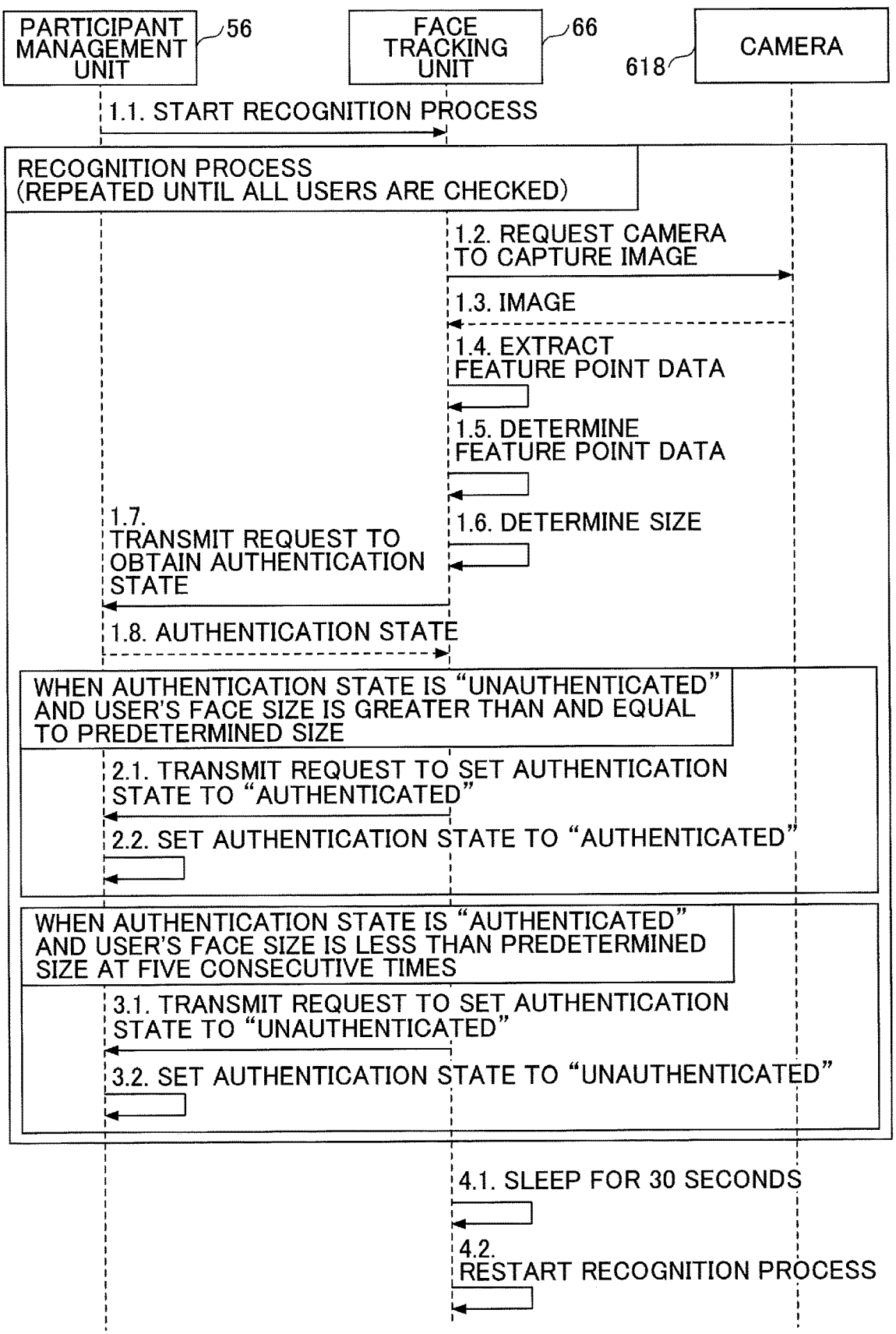
FIG. 23 is a diagram illustrating a recognition process performed by the face tracking unit according to the embodiment.

FIG. 23 is a diagram illustrating the recognition process performed by the face tracking unit 66 according to the embodiment.

First, in the electronic whiteboard apparatus 14, the participant management unit 56 requests the face tracking unit 66 to start the recognition process (sequence 1.1). Upon receiving the request, the face tracking unit 66 starts the recognition process.

In the recognition process, the face tracking unit 66 first requests the camera 618 to capture an image (sequence 1.2). Upon receiving the request, the camera 618 captures an image in front of the electronic whiteboard apparatus 14. The face tracking unit 66 receives the image transmitted from the camera 618 (sequence 1.3).

Next, the face tracking unit 66 extracts feature point data of a user's face from the image obtained from the camera 618 (sequence 1.4). Then, the face tracking unit 66 determines whether the extracted feature point data of the user's face matches pre-registered feature point data (sequence 1.5). Further, the face tracking unit 66 determines whether the size of the user's face displayed in the image obtained from the camera 618 is greater than or equal to the predetermined size (sequence 1.6).

Subsequently, the face tracking unit 66 transmits, to the participant management unit 56, a request to obtain the authentication state of the user, together with the user's user ID (sequence 1.7). Upon receiving the request together with the user ID, the participant management unit 56 extracts the authentication state from the user's participant information, and transmits the extracted authentication state to the face tracking unit 66. The face tracking unit receives the user's authentication state transmitted from the participant management unit 56 (sequence 1.8).

If the user's authentication state obtained in sequence 1.8 is set to "Unauthenticated", and the size of the user's face determined in sequence 1.6 is greater than and equal to the predetermined size, the face tracking unit 66 transmits, to the participant management unit 56, a request to set the user's authentication state to "Authenticated", together with the user's user ID (sequence 2.1). Upon receiving the request to set the user's authentication state to "Authenticated" together with the user ID, the participant management unit 56 identifies the user with the user ID, and sets the authentication state of the user's participant information to "Authenticated" (sequence 2.2).

If the user's authentication state obtained in sequence 1.8 is set to "Authenticated", and the size of the user's face determined in sequence 1.6 is less than the predetermined size at five consecutive times, the face tracking unit 66 transmits, to the participant management unit 56, a request to set the user's authentication state to "Unauthenticated", together with the user's user ID (sequence 3.1). Upon receiving the request to set the user's authentication state to "Unauthenticated" together with the user ID, the participant management unit 56 identifies the user with the user ID, and sets the authentication state of the user's participant information to "Unauthenticated" (sequence 3.2).

The face tracking unit 66 repeats the recognition process from sequence 1.2 to sequence 3.2 until the recognition process is performed for all users registered on the list of participants (sequence 4.1). When the recognition process is completed for all the users registered on the list of participants, the face tracking unit 66 enters sleep mode for 30 seconds (sequence 4.1), and performs the recognition process for all the users registered on the list of participants again.

As described above, the electronic whiteboard apparatus 14 according to the embodiment includes the authentication unit 56A configured to authenticate a plurality of users' logins, the registration unit 56B configured to register, on a list of participants, the users whose logins have been authenticated by the authentication unit 56A, the recognition unit 66A configured to perform recognition of each of the users registered on the list of participants, and the restriction unit 56C configured to restrict access to resources owned by a given user in response to determining that the given user satisfies the predetermined condition based on a result of recognition performed by the recognition unit 66A, while allowing the given user to remain registered on the list of participants. Accordingly, the electronic whiteboard apparatus 14 according to the above-described embodiment prevents unauthorized access to a user's resources from other users when the user is away from the electronic whiteboard apparatus 14.

According to an embodiment of the present invention, it is possible to prevent unauthorized access to a user's resources from other users when the user is away from the electronic whiteboard apparatus 14.

Further, the present invention is not limited to the above-described embodiments, and variations and modifications may be made without departing from the scope of the present invention. The information processing system 1 described in the embodiments is merely an example. Needless to say, there may be various system configurations according to the application and the purpose.

For example, a method for determining the distance between a user and the electronic whiteboard apparatus 14 is not limited to the method described in the above embodiments (namely the method for determining the distance by utilizing the size of a user's face in an image captured by the camera 618). For example, the electronic whiteboard apparatus 14 may use an intermediate distance communication means such as Bluetooth (registered trademark) or Radio-frequency identification (RFID) to constantly communicate with a communication terminal held by a user, and may determine the distance between the user and the electronic whiteboard apparatus 14 based on radio wave strength in the communication with the communication terminal held by the user.

The "information processing apparatus" according to the embodiments is not limited to the electronic whiteboard apparatus, and may be any apparatus as long as the apparatus can access resources owned by a user whose login has been authenticated. The "information processing apparatus" according to the embodiments may be a projector (PJ), an interactive whiteboard (IWB: a whiteboard having an electronic blackboard function capable of interactive communication), an output apparatus such as digital signage, a head-up display (HUD) apparatus, an industrial machine, an imaging apparatus, a sound collector, medical equipment, a network home appliance, a notebook personal computer (PC), a mobile phone, a smartphone, a tablet terminal, a game console, a personal digital assistant (PDA), a digital camera, a wearable PC, or a desktop PC.

Further, the functions of the above-described embodiments may be implemented by one or more processing circuitries. As used herein, the term "processing circuitry" includes a device such as a processor programmed to cause software to execute the functions, such as a processor implemented by an electronic circuitry, and an application-specific integrated circuit (ASIC), a digital signal processor (DSP), a field-programmable gate array (FPGA), and a circuit module designed to execute the above-described functions.

What is claimed is:

1. An information processing apparatus for use by a plurality of users, the information processing apparatus comprising:
   a memory; and
   a processor coupled to the memory and configured to authenticate logins of the plurality of users,
   register, on a list of participants, the plurality of users whose logins have been authenticated, the list of participants including (i) first information identifying a given user among the plurality of users whose logins have been authenticated and (ii) second information indicating that a resource owned by the given user is available,
   determine that the given user has moved at least a predetermined distance from the information processing apparatus,
   upon determining that the given user has moved at least the predetermined distance from the information processing apparatus, replacing the second information with third information indicating that the resource owned by the given user is not available, and
   restrict access to the resource owned by a given user while keeping the given user registered on the list of participants, based on the third information included in the participant list.

2. The information processing apparatus according to claim 1, wherein the processor is further configured to capture an image in vicinity of the information processing apparatus, and wherein the determination that the given user has moved at least the predetermined distance from the information processing apparatus is based on the captured image.

3. The information processing apparatus according to claim 1, wherein the processor is further configured to perform wireless communication with communication devices held by the plurality of users, and wherein the determination that the given user has moved at least the predetermined distance from the information processing apparatus is based on radio wave strength in the wireless communication.

4. The information processing apparatus according to claim 1, wherein restricting the access to the resource includes restricting one or both of reading of a file from a folder and saving of the file in the folder.

5. The information processing apparatus according to claim 1, wherein the processor is further configured to transmit a file to all of the plurality of users registered on the list of participants when a predetermined transmission operation is performed, all of the plurality of users including the given user owning the resource to which the access is restricted.

6. The information processing apparatus according to claim 1, wherein the processor is further configured to display, on a display, information enabling identification of whether access to a resource owned by each of the plurality of users registered on the list of participants is restricted.

7. An information processing system including an information processing apparatus for use by a plurality of users, the information processing system comprising:

an electronic whiteboard apparatus including a memory; and a processor coupled to the memory and configured to
authenticate logins of the plurality of users,
register, on a list of participants, the plurality of users whose logins have been authenticated, the list of participants including (i) first information identifying a given user among the plurality of users whose logins have been authenticated and (ii) second information indicating that a resource owned by the given user is available,
determine that the given user has moved at least a predetermined distance from the information processing apparatus,
upon determining that the given user has moved at least the predetermined distance from the information processing apparatus, replacing the second information with third information indicating that the resource owned by the given user is not available, and
restrict access to the resource owned by a given user while keeping the given user registered on the list of participants, based on the third information included in the participant list; and
a user information server apparatus storing information about the plurality of users.

8. A control method performed by an information processing apparatus for use by a plurality of users, the method comprising:
authenticating logins of the plurality of users,
registering, on a list of participants, the plurality of users whose logins have been authenticated, the list of participants including (i) first information identifying a given user among the plurality of users whose logins have been authenticated and (ii) second information indicating that a resource owned by the given user is available,
determine that the given user has moved at least a predetermined distance from the information processing apparatus,
upon determining that the given user has moved at least the predetermined distance from the information processing apparatus, replacing the second information with third information indicating that the resource owned by the given user is not available, and
restricting access to the resource owned by a given user while keeping the given user registered on the list of participants, based on the third information included in the participant list.

* * * * *